US009852733B2

(12) United States Patent
Yamada

(10) Patent No.: US 9,852,733 B2
(45) Date of Patent: Dec. 26, 2017

(54) DEVICE CONTROL METHOD, DISPLAY CONTROL METHOD, AND PURCHASE SETTLEMENT METHOD

(71) Applicant: Panasonic Intellectual Property Corporation of America, Torrance, CA (US)

(72) Inventor: Mariko Yamada, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 187 days.

(21) Appl. No.: 14/788,854

(22) Filed: Jul. 1, 2015

(65) Prior Publication Data
US 2015/0302857 A1 Oct. 22, 2015

Related U.S. Application Data

(63) Continuation of application No. PCT/JP2014/004253, filed on Aug. 20, 2014.
(Continued)

(30) Foreign Application Priority Data

Jul. 29, 2014 (JP) .................................. 2014-153721

(51) Int. Cl.
 *G10L 21/00* (2013.01)
 *G10L 17/22* (2013.01)
(Continued)

(52) U.S. Cl.
 CPC .......... *G10L 17/22* (2013.01); *G06Q 30/0633* (2013.01); *G10L 15/22* (2013.01); *G10L 17/00* (2013.01); *G10L 2015/223* (2013.01)

(58) Field of Classification Search
 CPC ......... G10L 15/26; G10L 15/30; G10L 15/00; G10L 2015/223; G10L 2015/227;
(Continued)

(56) References Cited

U.S. PATENT DOCUMENTS

| 2002/0013710 A1 | 1/2002 | Shimakawa | |
| 2002/0193989 A1* | 12/2002 | Geilhufe | G10L 15/26 704/208 |
| 2009/0055193 A1* | 2/2009 | Maislos | G06F 21/32 704/273 |

FOREIGN PATENT DOCUMENTS

| JP | 1-116789 | 5/1989 |
| JP | 2000-075954 | 3/2000 |

(Continued)

OTHER PUBLICATIONS

International Search Report of PCT application No. PCT/JP2014/004253 dated Nov. 18, 2014.

*Primary Examiner* — Huyen Vo
(74) *Attorney, Agent, or Firm* — Greenblum & Bernstein, P.L.C.

(57) ABSTRACT

A device control method includes acquiring voice information, obtaining a spoken command indicating a control instruction as to a device based on the acquired voice information, identifying speaker information relating to a speaker which has uttered the acquired voice information, based on the acquired voice information, identifying, out of a plurality of devices, a device to be controlled, based on the spoken command and the speaker information, and controlling the identified device to be controlled.

12 Claims, 24 Drawing Sheets

Related U.S. Application Data

(60) Provisional application No. 61/871,538, filed on Aug. 29, 2013.

(51) Int. Cl.
*G10L 15/22* (2006.01)
*G06Q 30/06* (2012.01)
*G10L 17/00* (2013.01)

(58) Field of Classification Search
CPC ......... G10L 15/07; G10L 15/32; G10L 17/00; G10L 2015/228; G10L 15/22; G10L 15/04; G10L 15/063; G10L 15/08; G10L 15/197; G10L 2015/0631
USPC .... 704/235, 250, 257, 255, 270, 270.1, 275, 704/251
See application file for complete search history.

(56) References Cited

FOREIGN PATENT DOCUMENTS

| | | |
|---|---|---|
| JP | 2001-296881 | 10/2001 |
| JP | 2002-182679 | 6/2002 |
| JP | 2008-228129 | 9/2008 |

\* cited by examiner

FIG. 22

| VOICE INFORMATION | AGE | GENDER |
|---|---|---|
| 001 | 5 YEARS OLD | MALE |
| 002 | 8 YEARS OLD | FEMALE |
| 003 | 35 YEARS OLD | MALE |
| 004 | 30 YEARS OLD | FEMALE |
| 005 | 68 YEARS OLD | FEMALE |

| USER NO. | VOICE INFORMATION | AGE | CREDIT CARD INFORMATION |
|---|---|---|---|
| 1001 | 003 | 35 YEARS OLD | VxCard/0000000099999999/2014/08 |
| 1002 | 004 | 30 YEARS OLD | MasCard/9999999900000000/2014/12 |
| 1003 | 153 | 28 YEARS OLD | VxCard/1234567891234567/2015/08 |
| 1004 | 325 | 45 YEARS OLD | VxCard/5555555555555555/2014/03 |
| 1005 | 856 | 55 YEARS OLD | JizCard/0000111122223333/2015/12 |

1403

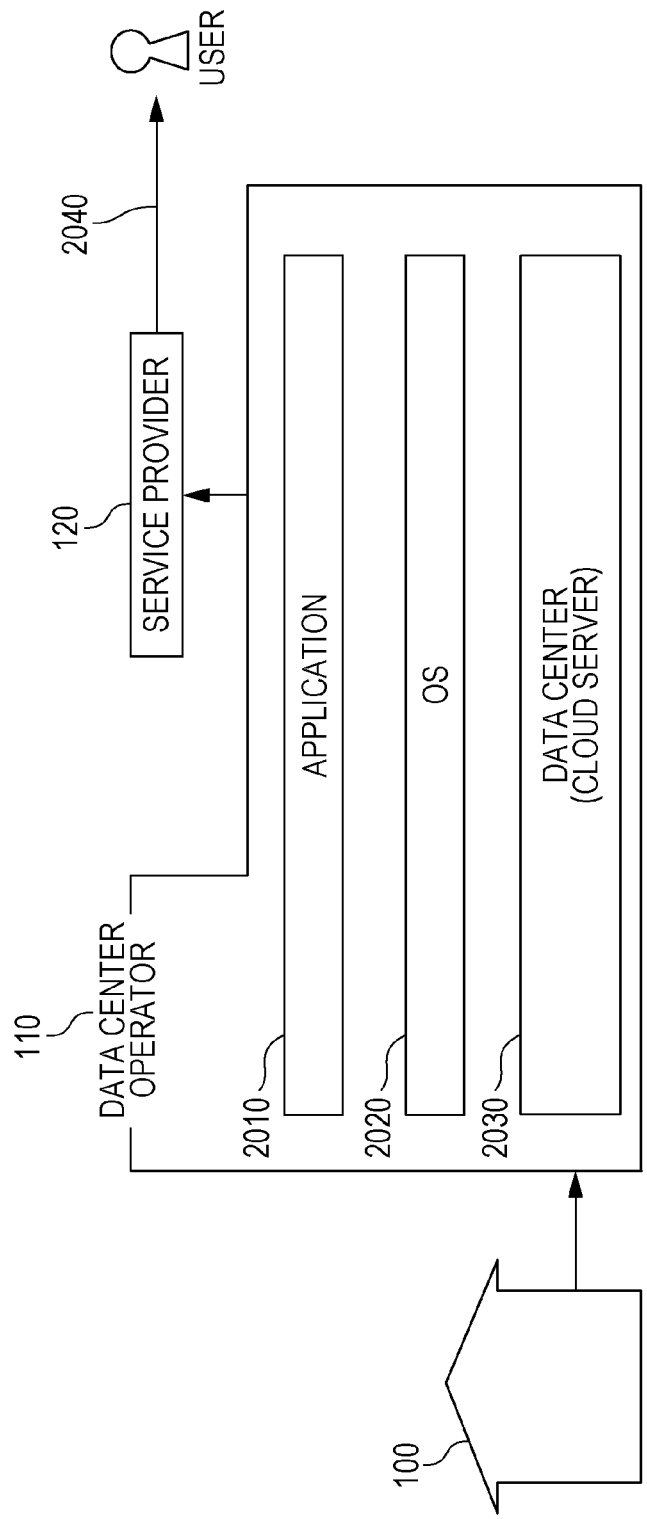

DEVICE CONTROL METHOD, DISPLAY CONTROL METHOD, AND PURCHASE SETTLEMENT METHOD

BACKGROUND

1. Technical Field

The present disclosure relates to a device control method of controlling multiple devices by voice, a display control method of controlling a display device which displays information relating to multiple device controlled based on voice of a speaker, and a purchase settlement method of purchasing goods by voice.

2. Description of the Related Art

There has conventionally been a voice recognition system for operation and control of various devices within the home. A service has been proposed regarding such voice recognition systems where not only are devices controlled by voice input, but also a pseudo conversation is held with devices by giving voice responses to spoken instructions of the user (e.g., see Japanese Unexamined Pat. Application Publication No. 2002-182679).

SUMMARY

However, the above voice recognition system allows any speaker who has spoken to control all devices in the same way. Accordingly, a speaker who is undesirable to control a device can give spoken instructions to the device. Accordingly, a way to keep a speaker who is undesirable to control a device from controlling the device by voice has not been studied in conventional voice recognition systems.

One non-limiting and exemplary embodiment provides a device control method, display control method, and purchase settlement method, which enables keeping a speaker who is undesirable to control a device from controlling the device by voice.

In one general aspect, the techniques disclosed here feature a device control method. The method includes: acquiring voice information; obtaining a spoken command indicating a control instruction as to a device based on the acquired voice information; identifying speaker information relating to a speaker which has uttered the acquired voice information, based on the acquired voice information; identifying, out of a plurality of devices, a device to be controlled, based on the spoken command and the speaker information; and controlling the identified device to be controlled.

According to the present disclosure, a device to be controlled is identified out of multiple devices based on spoken commands and speaker information, so in a case where speaker information relating to a speaker regarding which controlling the device is undesirable is identified, the speaker regarding which controlling the device is undesirable can be kept from controlling the device by voice.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 22 is a diagram illustrating an example of a first table showing the relationship between voice information recorded in a database, estimated age, and estimated gender;

FIG. 23 is a diagram illustrating an example of a first table showing the relationship between user Nos., voice information, age, and credit card information, stored in a purchase settlement database;

FIG. 27 is a diagram illustrating an overall image of service provided by a voice recognition system according to a type 4 service (SaaS usage type cloud service).

DETAILED DESCRIPTION

Figure 1A:
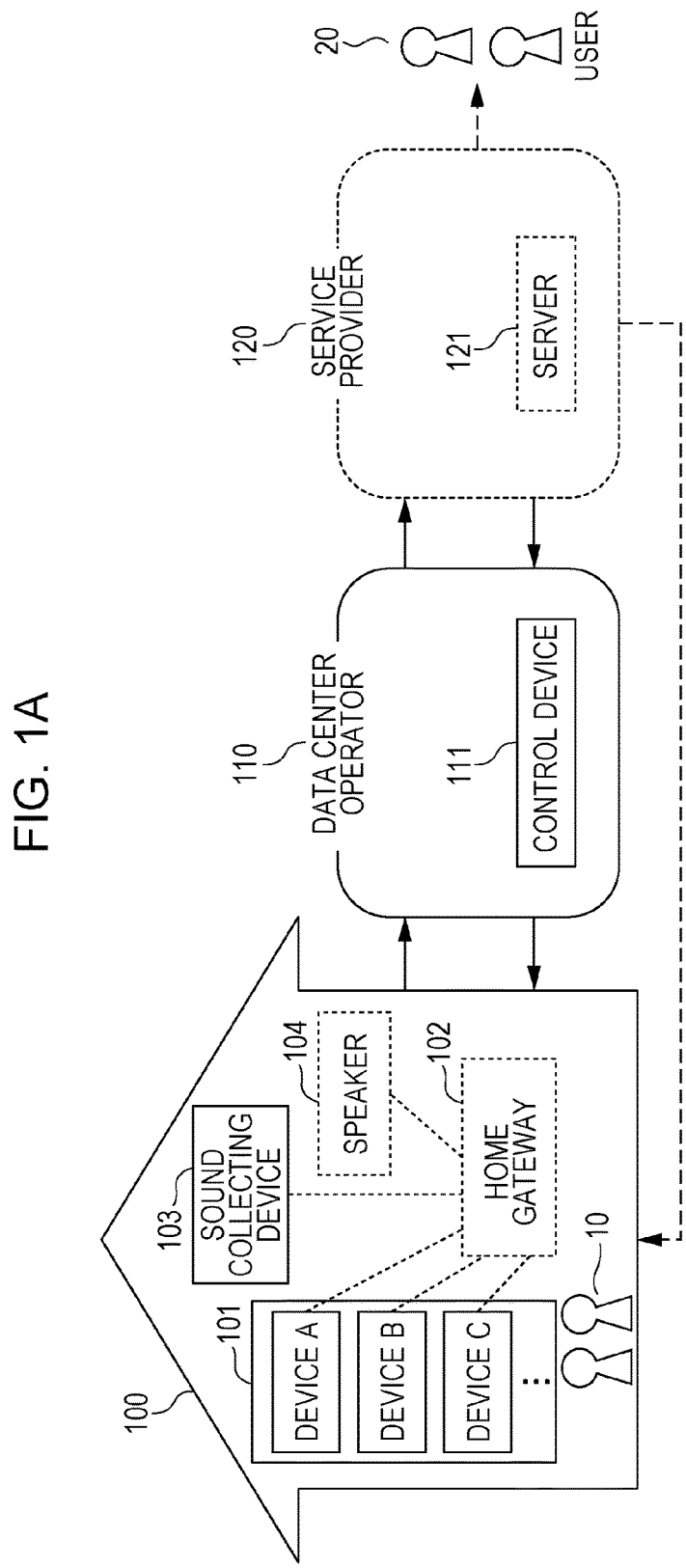
FIG. 1A is a diagram illustrating an overall view of a voice recognition system according to an embodiment.

Underlying Knowledge Forming Basis of the Present Disclosure

Japanese Unexamined Patent Application Publication No. 2002-182679 discloses a voice recognition system where appropriate devices reply and operate in response to spoken commands from a user, by multiple devices connected to a network exchanging information with each other.

However, the voice recognition system according to Japanese Unexamined Patent Application Publication No. 2002-182679 performs the same replies and operations regardless of whoever utters the spoken command. That is to say, even a third party which is not a family member, and does not own the multiple devices to be controlled, can operate these devices in the same way as a family member by uttering speech. Situations are also conceivable where a child might operate a cooking device which uses fire by spoken commands, or might operate devices which a child has no need to operate.

Also, a voice recognition system where dialogue is held with multiple device, such as in Japanese Unexamined Patent Application Publication No. 2002-182679, is expected to be configured into a voice recognition system where not only are devices controlled, but further where goods can be purchased by spoken commands. For example, in a scene where a user is holding a dialogue with a refrigerator, an arrangement can be configured where the user has specified a food product that is gone from the refrigerator, the refrigerator queries whether or not to purchase the specified food product, and if the user has selected to make the purchase, that food product is ordered over a network. In this case, it is undesirable for the voice recognition system to be operable by anyone's voice.

That is to say, with a conventional voice recognition system such as described in Japanese Unexamined Patent Application Publication No. 2002-182679, anyone can operate all device by voice, and consideration had not been given to not allowing a speaker who is undesirable to control a device to operate the device by voice. Also, a voice recognition system by which products can be safely purchased by voice recognition had not been conventionally studied.

In order to solve the above problem, a device control method according to an aspect of the present disclosure is a device control method. The method includes: acquiring voice information; obtaining a spoken command indicating a control instruction as to a device based on the acquired voice information; identifying speaker information relating to a speaker which has uttered the acquired voice information, based on the acquired voice information; identifying, out of a plurality of devices, a device to be controlled, based on the spoken command and the speaker information; and controlling the identified device to be controlled.

According to this configuration, a device to be controlled is identified out of a plurality of devices based on the spoken command and speaker information, so if speaker information relating to a speaker who is undesirable to control a device has been identified, a speaker who is undesirable to control a device can be kept from controlling the device by voice.

In the above aspect, the speaker information preferably includes information relating to age of the speaker.

According to this configuration, control of a device by voice can be prevented according to the age of the speaker. For example, a device can be kept from being controlled by voice by children or the elderly.

Also, in the above aspect, in the identifying of the device to be controlled, a first table storing the speaker information and candidate devices indicating candidates of the devices to be controlled in a correlated manner, and a second table storing the spoken command and the candidate devices in a correlated manner, preferably are each referenced, and the candidate device matching both the first table and the second table are identified as the device to be controlled.

According to this configuration, a first table storing the speaker information and candidate devices indicating candidates of the devices to be controlled in a correlated manner, and a second table storing the spoken command and the candidate devices in a correlated manner, are each referenced, and the candidate device matching both the first table and the second table are identified as the device to be controlled.

Accordingly, a candidate device matching the candidate devices corresponding to identified speaker information and candidate devices corresponding to acquired spoken commands is decided as the device to be controlled, so the device to be controlled can be easily decided.

Also, in the above aspect, in the identifying of the device to be controlled, in a case where there is no candidate device matching both the first table and the second table, notification is preferably made to the effect that there is no device to be controlled.

According to this configuration, notification is made to the effect that there is no device to be controlled, so the user can know that there is not device to be controlled by the spoken command that was uttered.

Also, in the above aspect, in the identifying of the device to be controlled, a third table that stores the speaker information and a usage history of devices by the speaker corresponding to the speaker information in a correlated manner is preferably referenced, and the device to be controlled is identified based on the usage history of the device by the speaker corresponding to the speaker information, and the spoken command.

According to this configuration, in a case where there are multiple candidate devices, a device used at the same time-of-day in the past can be decided as the device to be controlled, and also, a device which has been used most frequently in the past can be decided as the device to be controlled.

Also, in the above aspect, in the identifying of the device to be controlled, a device regarding which the usage frequency by the speaker at the time-of-day of acquisition of the voice information is high is preferably identified as the device to be controlled with priority, using history information relating to the time-of-day at which devices have been used.

Also, in the above aspect, a fourth table in which individuals of each group and voice modes are correlated is preferably referenced in the identifying of speaker information. In a case where identification is made that speaker information is of a person not belonging to the groups, the controlling is not performed.

Also, in the above aspect, the device control method preferably further includes: acquiring speaker location information indicating the location of the speaker, and device location information indicating the location of each of the plurality of devices. In the identifying of a device to be controlled, the device to be controlled is identified based on the spoken command, the speaker information, the speaker location information, and the device location information.

According to this configuration, speaker location information indicating the location of the speaker, and device location information indicating the location of each of the plurality of devices, are acquired, and the device to be controlled is identified based on the spoken command, the speaker information, the speaker location information, and the device location information, so in a case where there are multiple candidate devices, the device closest to the location of the speaker can be decided to be the device to be controlled.

Also, in the above aspect, the speaker location information and the device location information preferably are acquired, based on the voice information acquired at each of the multiple devices.

Also, in the above aspect, the content of the controlling regarding the identified device to be controlled preferably is changed according to the speaker information.

Also, in the above aspect, the device control method preferably further includes: controlling the display device to display a list of first information relating to the plurality of devices which can be controlled by voice; and controlling the display device to display second information, indicating that control of the device by voice is not accepted with regard to a particular speaker, at a predetermined position from the first information corresponding to the device regarding which control is not accepted.

According to this configuration, a list of first information relating to the plurality of devices which can be controlled by voice is displayed. Second information, indicating that control of the device by voice is not accepted with regard to a particular speaker, is displayed near the first information corresponding to the device regarding which control is not accepted.

Accordingly, the user can easily confirm the multiple devices which can be controlled by voice, and also can confirm, of the multiple devices which can be controlled by voice, devices which do not accept control by a particular speaker.

A display control method according to another aspect of the present disclosure is a display control method of controlling a display device that displays information relating to a plurality of devices controlled based on voice from a speaker. The method includes: controlling the display device to display a list of first information relating to a plurality of devices that can be controlled by voice; controlling the display device to display second information, indicating that control of the device by voice is not accepted with regard to a particular speaker, at a predetermined position from the first information corresponding to the device regarding which control is not accepted.

According to this configuration, a list of first information relating to a plurality of devices that can be controlled by voice is displayed. Second information, indicating that control of the device by voice is not accepted with regard to a particular speaker, is displayed at a predetermined position from the first information corresponding to the device regarding which control is not accepted.

Accordingly, the user can easily confirm the multiple devices which can be controlled by voice, and also can confirm, of the multiple devices which can be controlled by voice, devices which do not accept control by a particular speaker.

Also, in the above aspect, the display device preferably is a touch panel display, the display screen of the display device displaying the first information, and the second information displayed at a position different from the first information. The display control method further comprising: controlling the display device to display the second information at a predetermined position from the first information, by the user touching a display region displaying the second information, dragging the second information toward the first information, and dropping the second information on the first information; and changing, in a case where the second information is displayed at a predetermined position from the first information, settings regarding the particular speaker so that control by voice of a device corresponding to the first information is not accepted.

According to this configuration, displayed on the display screen of the display device are the first information, and the second information at a position different from the first information. The second information is displayed at a predetermined position from the first information, by the user touching a display region displaying the second information, dragging the second information toward the first information, and dropping the second information on the first information. In a case where the second information is displayed at a predetermined position from the first information, settings regarding the particular speaker are changed so that control by voice of a device corresponding to the first information is not accepted.

Accordingly, of the multiple devices that can be controlled by voice, devices not accepting control by a particular speaker can be easily set.

Also, in the above aspect, the display control method preferably further includes: transmitting a control command, to perform audio output to the effect that the identified device to be controlled will be controlled, to an output unit that outputs audio.

Also, in the above aspect, the display control method preferably further includes: controlling the device to be controlled, where a light-emitting unit, provided to each identified device to be controlled, is caused to emit light.

A purchase settlement method according to another aspect of the present disclosure includes: acquiring voice information; obtaining a spoken command indicating a control instruction as to a device based on the acquired voice information; identifying, in a case where the spoken command is a spoken command relating to purchase settlement, speaker information relating to the speaker who has spoken the acquired voice information, based on the acquired voice; determining whether or not the identified speaker information is speaker information of a speaker permitted to perform purchase settlement by referencing a table in which is correlated speaker information of speakers permitted to perform purchase settlement, and information necessary for purchase settlement; and performing purchase settlement processing, in a case of determining that the identified speaker information is speaker information of a speaker permitted to perform purchase settlement, using the spoken command and the information necessary for purchase settlement.

Also, in the above aspect, the purchase settlement processing is performed, in a case where the price of the goods to be purchased is equal to or below a predetermined price. The purchase settlement method further comprising: controlling, in a case where the price of the goods to be purchased is equal to or above the predetermined price, the device to output audio, prompting speaking of a password to perform the purchase settlement processing.

Also, in the above aspect, the purchase settlement method preferably further includes: acquiring speaker location information indicating the location of the speaker. Determination is made regarding the whether or not the speech is of a speaker permitted to perform purchase settlement, based on the speaker location information.

According to this configuration, a table is referenced in which is correlated speaker information of speakers permitted to perform purchase settlement, and information necessary for purchase settlement, whether or not the identified speaker information is speaker information of a speaker permitted to perform purchase settlement is determined, and in a case of determining that the identified speaker information is speaker information of a speaker permitted to perform purchase settlement, purchase settlement processing is performed using the spoken command and the information necessary for purchase settlement.

Accordingly, in a case of identifying speaker information relating to a speaker regarding which purchasing goods is undesirable, the speaker regarding which purchasing goods is undesirable can be kept from purchasing goods by voice.

Overall Configuration of Voice Recognition System

Figure 1B:
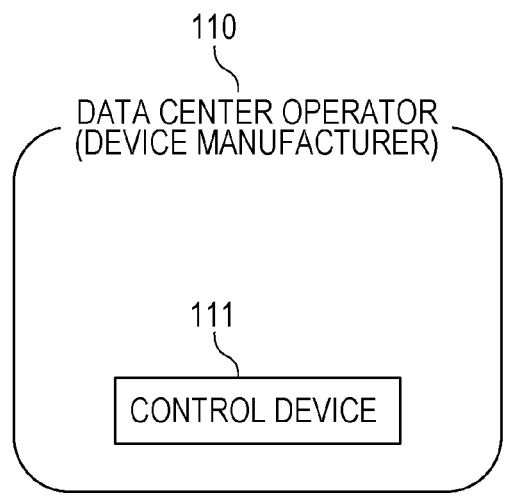
FIG. 1B is a diagram illustrating an example where a device manufacturer serves as a data center operator.
Figure 1C:
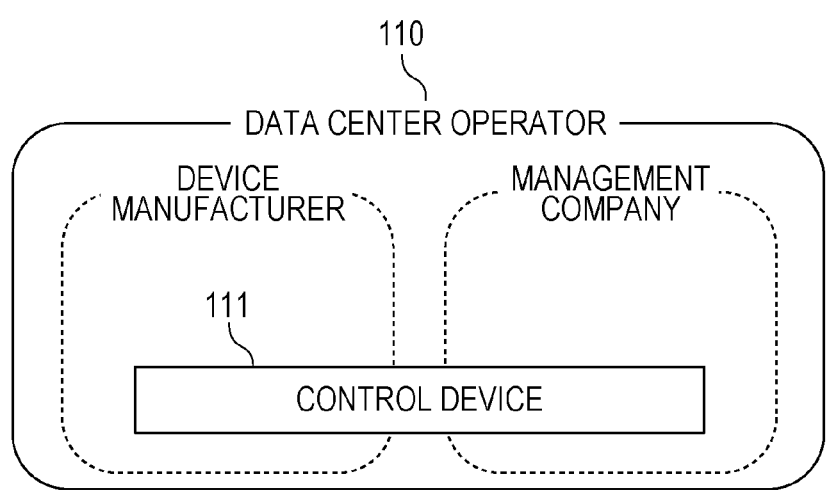
FIG. 1C is a diagram illustrating an example where either one of a device manufacturer and a management company serves as a data center operator.

FIG. 1A is a diagram illustrating an overall configuration of the voice recognition system according to the present embodiment. FIG. 1B is a diagram illustrating an example where a device manufacturer serves as a data center operator. FIG. 1C is a diagram illustrating an example where either one of a device manufacturer and a management company serves as a data center operator.

The group 100 is, for example, a corporation, an organization, a home, or the like. The scale thereof is irrelevant. The group 100 has multiple devices 101 including a device A, device B, and device C, a home gateway 102, a sound collecting device 103, and a speaker 104.

The multiple devices 101 include those which are capable of connecting to the Internet, (e.g., a smartphone, personal computer (PC), television set, etc.). The multiple devices 101 also include those which are incapable of connecting to the Internet on their own (e.g., lighting, washing machine, refrigerator, etc.). There may be in the multiple devices 101 those which are incapable of connecting to the Internet on their own but can be connected to the Internet via the home gateway 102. A user 10 also uses the multiple devices 101 within the group 100. The devices which are capable of connecting to the Internet may directly control to a control device 111 which will be described later, without going through the home gateway 102. The multiple devices 101 receive control commands from the later-described control device 111, either directly or via the home gateway 102.

The home gateway 102 connects to part or all of the multiple devices 101, the sound collecting device 103, and the speaker 104, and transmits/receives various types of information. The home gateway 102 and the devices may be connected in a wired manner using cables or the like, or may be wirelessly connected using Wi-Fi or Bluetooth (a registered trademark) or the like. The home gateway 102 also connects to the control device 111 and transmits/receives information.

The sound collecting device 103 acquires sound within the room where the group 100 is. The obtained audio is directly output to the control device 111 via the home gateway 102. The sound collecting device 103 is configured as a common microphone, and the installation location of the sound collecting device 103 is not restricted in particular. The sound collecting device 103 is preferably installed at the ceiling or in an illumination device or the like, where sound from the room can be readily acquired. The sound collecting device 103 may also have functions to orient the directivity thereof in a direction toward the user 10.

The sound collecting device 103 does not need to be fixed in the room, and may be provided in a portable mobile terminal such as a smartphone or the like.

The speaker 104 receives control commands from the control device 111 via the home gateway 102, and outputs sound in accordance with the received control commands. The speaker 104 also directly receives control commands from the control device 111, and outputs sound in accordance with the received control commands. Note that the home gateway 102 and speaker 104 are not indispensable components of the voice recognition system.

A data center operator 110 includes the control device 111. The control device 111 is a virtual server which collaborates with various devices over the Internet. The control device 111 primarily manages massive data (so-called "big data") or the like that is difficult to handle with normal database management tools and the like. The data center operator 110 manages data, manages the control device 111, and serves as an operator of a data center which performs the management.

Now, the data center operator 110 is not restricted just to management of data and management of the control device 111. For example, In a case where a device manufacturer which develops or manufactures one of the devices of the multiple devices 101 manages the data or manages the control device 111 or the like, the device manufacturer serves as the data center operator 110, as illustrated in FIG. 1B. Also, the data center operator 110 is not restricted to being a single company. For example, in a case where a device manufacturer and a management company manage data or manage the control device 111 either conjointly or in shared manner, as illustrated in FIG. 1C, both, or one or the other, serve as the data center operator 110.

The control device 111 is connected to the home gateway 102 via the Internet, and transmits/receives various types of information to and from the multiple devices 101 connected to the home gateway 102, the sound collecting device 103, and the speaker 104. The control device 111 also is directly connected to the multiple devices 101, the sound collecting device 103, the speaker 104, and so forth, via the Internet, and transmits/receives various types of information. The control device 111 connects to a later-described server 121 and transmits/receives information.

The service provider 120 includes the server 121 for providing services to the user 10. The scale of the server 121 here is irrelevant, and may also include memory or the like in a PC used by an individual, for example. Further, there may be cases where the service provider 120 does not include a server 121. The service provider 120 and the data center operator 110 may be the same company. The server 121 receives information from the control device 111, and performs control and processing relating to services to be provided to the user. The services may be provided to the user 10 within the group 100, or may be provided to a user 20 outside of the group 100.

Figure 2:
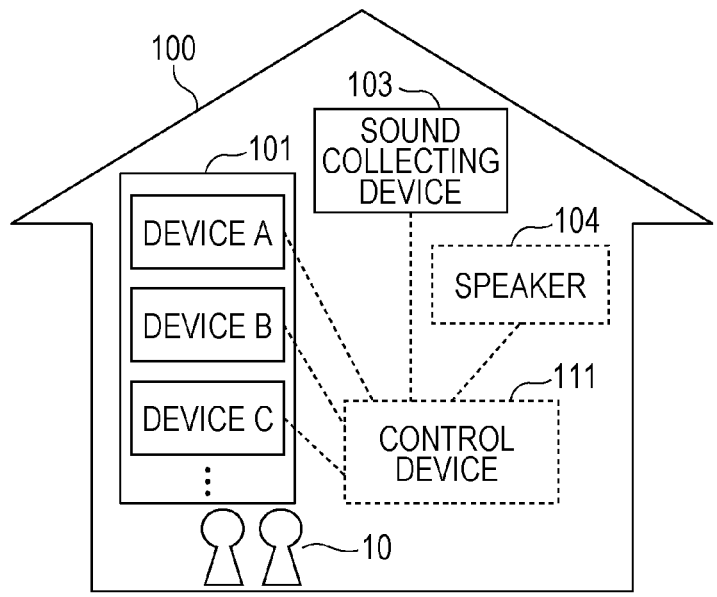
FIG. 2 is a diagram illustrating an overall configuration of a voice recognition system according to a modification of the present embodiment.

Note that while FIG. 1A illustrates the control device 111 outside of the home of the group 100, the present disclosure is not restricted to this in particular, and the control device 111 may be installed within the home of the group 100, as illustrated in FIG. 2.

FIG. 2 is a diagram illustrating an overall configuration of a voice recognition system according to a modification of the present embodiment. As illustrated in FIG. 2, the control device 111 may be within the group 100.

This has been a description of the overall configuration of the voice recognition system so far. Embodiments will be described below. Note that the embodiments described below are all specific examples of the present disclosure. Values, shapes, components, steps, orders of steps, and so forth in the following embodiments are only exemplary, and are not intended to restrict the present disclosure. Components in the following embodiments which are not included in an independent Claim of the present disclosure indicating the highest concept are described as being optional components. Also, in all of the embodiments, the contents of each can be combined.

First Embodiment

Configuration of Devices

Figure 3:
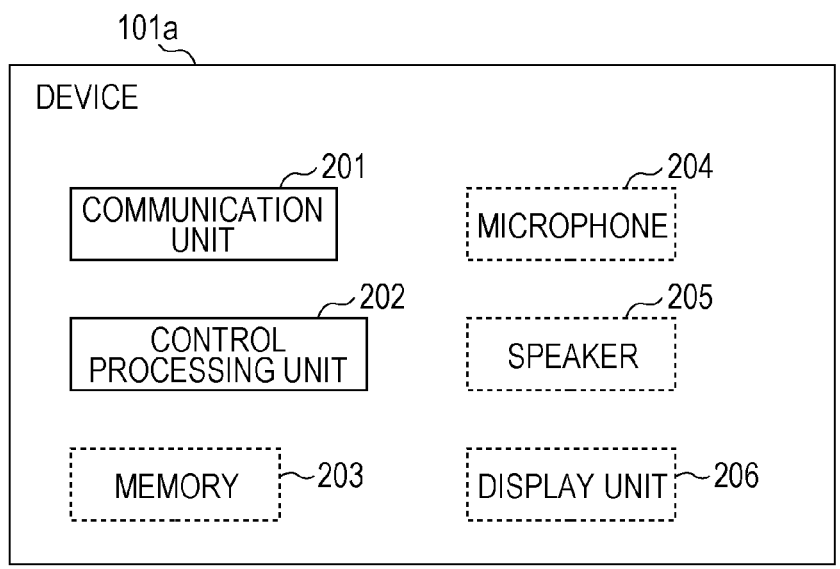
FIG. 3 is a diagram illustrating the configuration of a device according to a first embodiment of the present disclosure.
Figure 4:
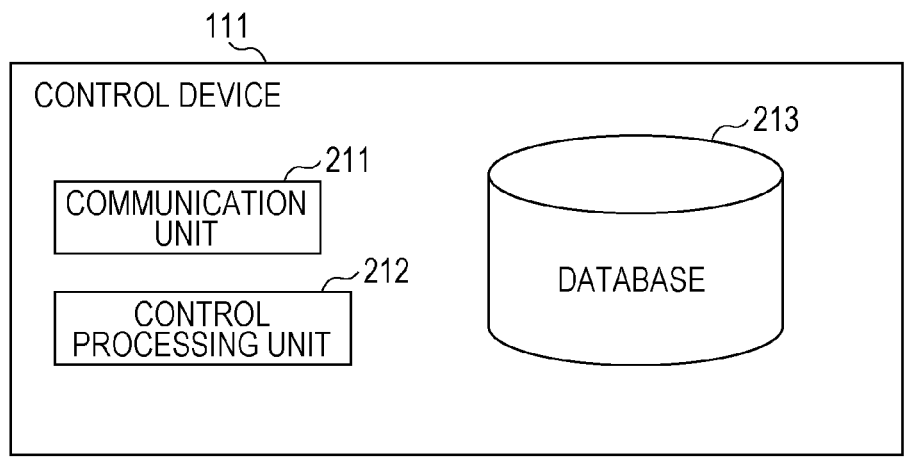
FIG. 4 is a diagram illustrating the configuration of a control device according to the first embodiment of the present disclosure.
Figure 5:
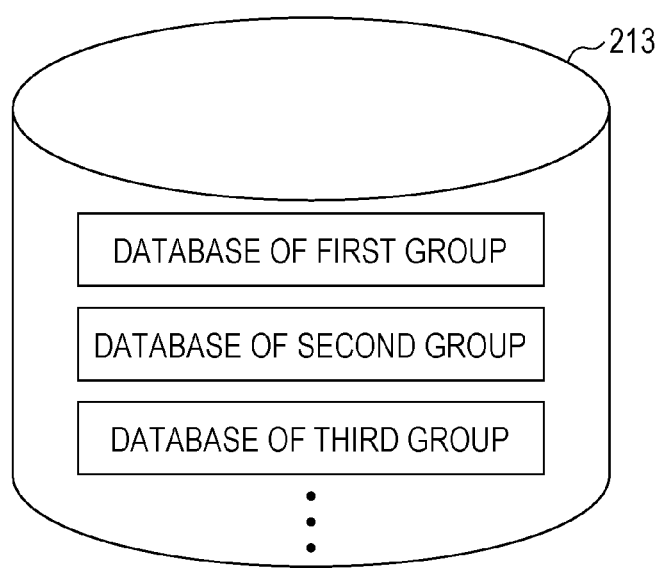
FIG. 5 is a diagram illustrating the configuration of a database according to the first embodiment of the present disclosure.

FIG. 3 is a diagram illustrating the configuration of a device according to a first embodiment of the present disclosure. FIG. 4 is a diagram illustrating the configuration of a control device according to the first embodiment of the present disclosure. FIG. 5 is a diagram illustrating the configuration of a database according to the first embodiment of the present disclosure.

First, the configuration of the multiple devices 101 in FIG. 1A (device A, device B, device C, and so forth) will be described with reference to FIG. 3. Note that the multiple devices 101 here encompass any and all devices within the home. A device 101*a* is one device of the multiple devices 101. The device 101*a* includes various devices such as, for example, a television, Blu-ray (BR (a registered trademark)) disc recorder, air conditioner, refrigerator, washing machine, microwave oven, various types of cooking appliances (gas cooking stove and induction heating (IH) cooking heater), and so forth, and is not restricted in particular. The device 101*a* is not restricted to electric home appliances, and may be electric produces used within the home, including housing equipment, sensor measuring and detecting housing environment, and electric vehicles and the like.

The device 101*a* includes, for example, a communication unit 201, a control processing unit 202, memory 203, a microphone 204, a speaker 205, and a display unit 206. However, the device 101*a* includes various device as described above, so the configuration of the device 101*a* is not restricted to this. The device 101*a* may be without any or all of the memory 203, microphone 204, speaker 205, and display unit 206, for example. The device 101*a* may also include other configurations not illustrated.

The communication unit 201 transmits and receives information to and from various types of devices, over a network or via various types of cables or the like. The communication unit 201 is configured including hardware such as various types of communication integrated circuits (IC) or the like.

The control processing unit 202 processes and computes various types of data (information) received by the communication unit 201, and controls operations of the configurations within the device 101. The control processing unit 202 is configured including hardware such as, for example, a central processing unit (CPU) or the like.

The memory 203 stores data (information) received by the communication unit 201, data (information) computed by the control processing unit 202, control programs, and so forth. The memory 203 is configured including hardware such as, for example, read only memory (ROM) or the like.

The microphone 204 picks up (acquires) spoken commands from a person, for example. The microphone 204 is not restricted in particular, as long as it can be mounted on a device in general. The speaker 205 and display unit 206 are also sufficient as long as they can be mounted on a device in general, so description thereof will be omitted.

Next, the configuration of the control device 111 will be described with reference to FIG. 4. The control device 111 includes a communication unit 211, a control processing unit 212, and a database 213. Note however, that the control device 111 is not restricted to this configuration. Part of the control device 111 may be omitted, and other configurations may be included.

The communication unit 211 transmits and receives information to and from various types of devices, over a network or via various types of cables or the like. The communication unit 211 is configured including hardware such as various types of communication ICs or the like.

The control processing unit 212 processes and computes various types of data (information) received by the communication unit 211, and controls operations of the configurations within the control device 111 or multiple devices 101. The control processing unit 212 is configured including hardware such as, for example, a CPU or the like.

The database 213 stores various types of data. The database 213 may include human voices acquired by the microphone 204 or sound collecting device 103 of the device 101*a*, usage history of the device 101*a*, and so forth. The data stored in the database 213 is used for processing to estimate the age and gender of the speaker by the control processing unit 212. The database 213 may also store data acquired by group (family, company, organization, etc.) in a correlated manner, as illustrated in FIG. 5. That is to say, the database 213 may include a database storing data of a first group, a database storing data of a second group, and a database storing data of a third group.

Functional Configuration of Voice Recognition System

Figure 6:
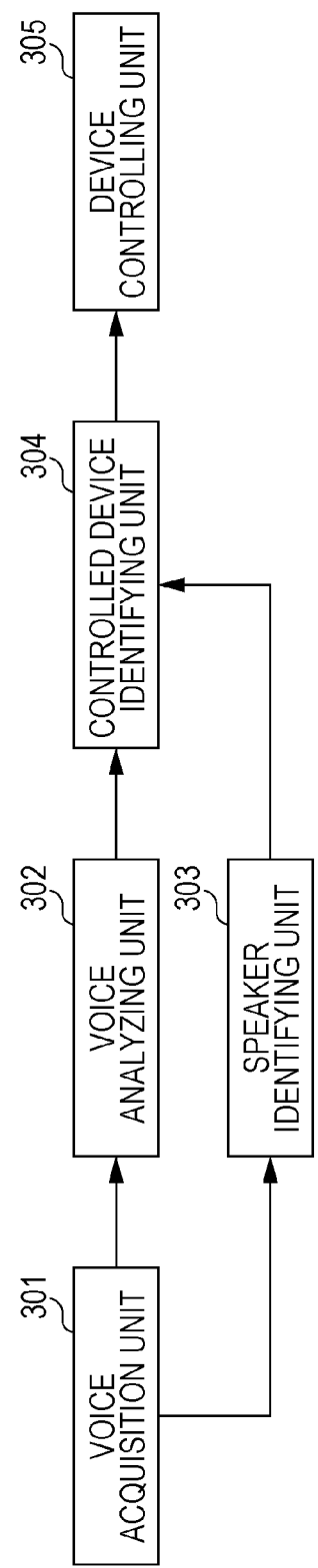
FIG. 6 is a diagram illustrating the functional configuration of a voice recognition system according to the first embodiment of the present disclosure.

FIG. 6 is a diagram illustrating a functional configuration diagram of a voice recognition system according to a first embodiment of the present disclosure. The voice recognition system includes a voice acquisition unit 301, a voice analyzing unit 302, a speaker identifying unit 303, a controlled device identifying unit 304, and a device controlling unit 305, as illustrated in FIG. 6.

The voice acquisition unit 301 acquires voice information representing voice which a speaker has uttered in the vicinity of a device. The voice acquisition unit 301 is realized by the sound collecting device 103 or a microphone 204 installed in the devices.

The voice analyzing unit 302 analyzes voice information acquired by the voice acquisition unit 301, thus acquiring spoken commands. The voice analyzing unit 302 is realized by the control processing unit 212 of the control device 111. The voice analyzing unit 302 analyzes voice information acquired by the voice acquisition unit 301, thus acquiring spoken commands representing control instructions for the device.

The speaker identifying unit 303 identifies speaker information relating to a speaker who has uttered the acquired voice information, based on the voice information acquired by the voice acquisition unit 301. The speaker identifying unit 303 here identifies the general age, gender, and so forth, of the speaker. The speaker identifying unit 303 is realized by the control processing unit 212 and database 213 of the control device 111. The control processing unit 212 estimates the age, gender, and so forth, of the speaker who has uttered the voice information, by comparing data relating to voice of each age and gender that is stored in the database 213, and voice information acquired by the voice acquisition unit 301.

That is to say, the speaker information includes information relating to the age of the speaker. The database 213 stores information regarding multiple ages, and voice models whereby the ages can be estimated, in a correlated manner. Note that age is not restricted to being an age of a certain year, such as ten years old, but may include a predetermined age range, such as from zero years old to ten years old. The speaker identifying unit 303 identifies a voice model which matches the voice information acquired by the voice acquisition unit 301, and identifies the age correlated with the identified voice model.

Note that the speaker information may identify the speaker in further detail, and not just general information such as age or gender. For example, the database 213 may store information relating to the detailed age, gender, preferences, lifestyle patterns, and so forth, of the speaker, correlated with voice information (voice model) of each speaker. In this case, the speaker identifying unit 303 can identify the speaker in further detail.

The controlled device identifying unit 304 identifies, out of the multiple devices 101, a device to be controlled, based on the speaker information identified by the speaker identifying unit 303. The controlled device identifying unit 304 is realized by the control processing unit 212 and the database 213 of the control device 111, for example. While the controlled device identifying unit 304 is described in the present embodiment as identifying devices to be controlled based on speaker information, the controlled device identifying unit 304 may identify controlled devices based only on speaker information identified by the speaker identifying unit 303, or may identify controlled devices based on information other than speaker information identified by the speaker identifying unit 303. Details of processing to identify controlled devices based on information other than speaker information will be described later.

The device controlling unit 305 controls controlled devices identified by the controlled device identifying unit 304, based on spoken commands analyzed by the voice analyzing unit 302. The device controlling unit 305 is realized by the control processing unit 202 of the device 101a.

Flowchart of Voice Recognition System

Figure 7:
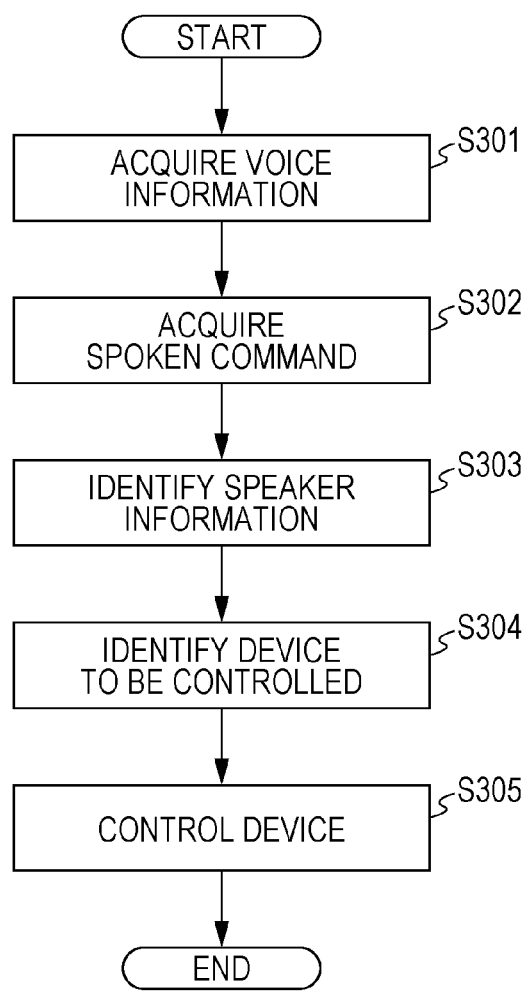
FIG. 7 is a flowchart illustrating the operations of the voice recognition system according to the first embodiment of the present disclosure.

The following is a description of the flow of the device control method voice recognition system with reference to FIG. 7. FIG. 7 is a flowchart illustrating the operations of the voice recognition system according to the first embodiment of the present disclosure.

First, in step S301 the voice acquisition unit 301 acquires voice information of the speaker.

Next, in step S302 the voice analyzing unit 302 analyzes the voice information acquired by the voice acquisition unit 301 and acquires a spoken command.

In step S303 the speaker identifying unit 303 then identifies speaker information relating to the speaker who uttered the acquired voice information, based on the voice information acquired by the voice acquisition unit 301.

Next, in step S304 the controlled device identifying unit 304 identifies the device to be controlled out of the multiple devices 101, based on the spoken command acquired by the voice analyzing unit 302 and the speaker information identified by the speaker identifying unit 303. Note that the device to be controlled here may be identified from the identified speaker information alone.

In step S305, the device controlling unit 305 then controls the device to be controlled, that has been identified by the controlled device identifying unit 304.

Operation Example of Voice Recognition System

Figure 8:
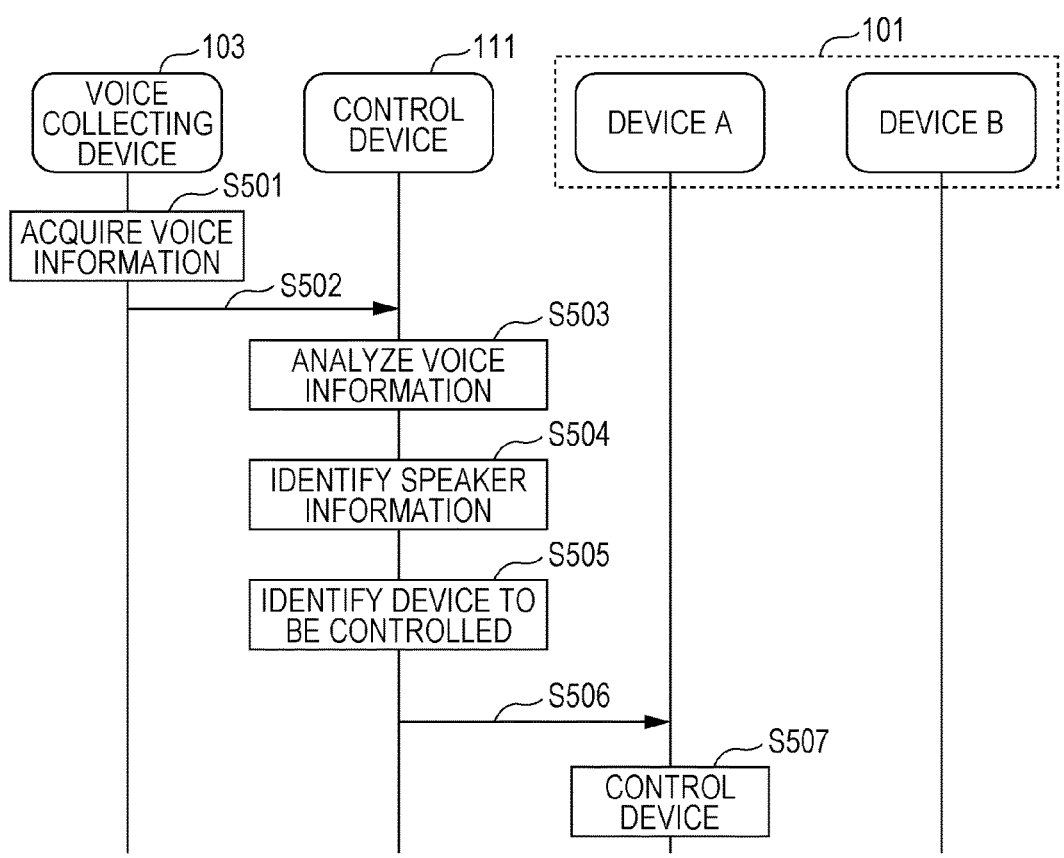
FIG. 8 is a sequence diagram for describing the operations regarding a first device in the voice recognition system according to the first embodiment of the present disclosure.
Figure 9:
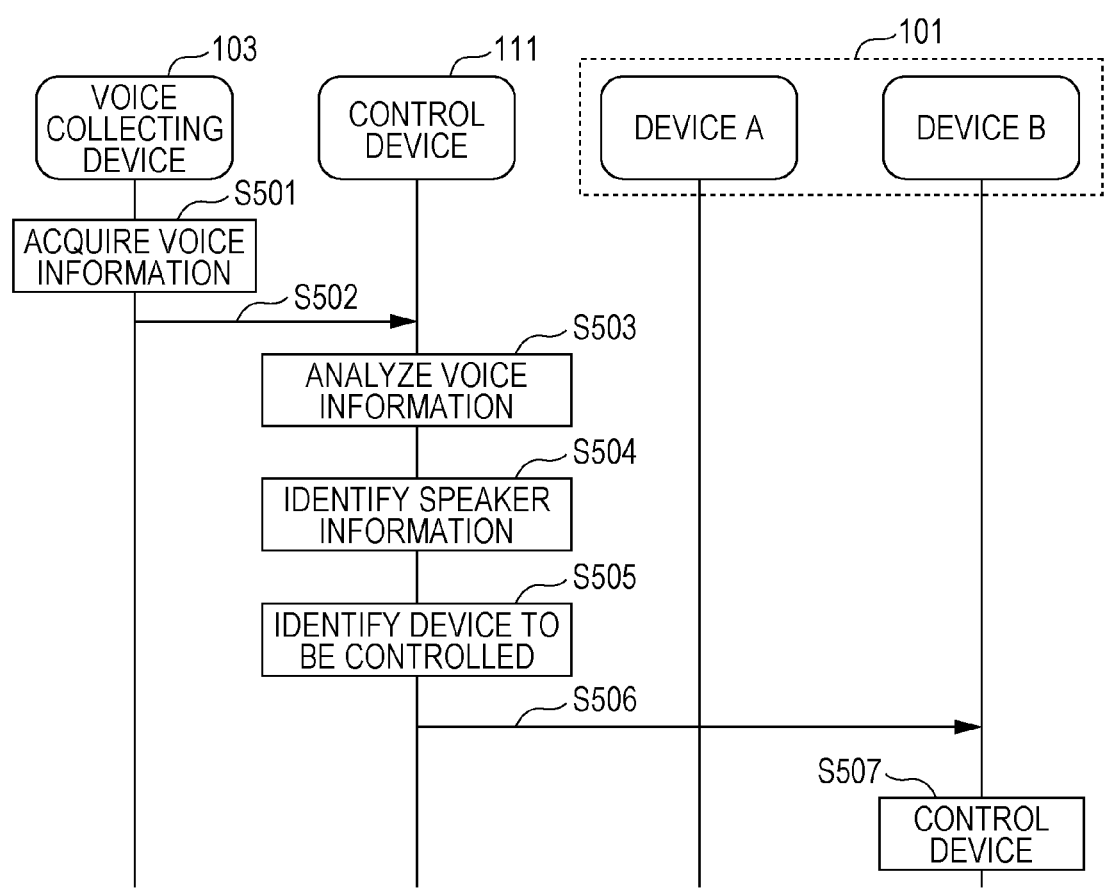
FIG. 9 is a sequence diagram for describing the operations regarding a second device in the voice recognition system according to the first embodiment of the present disclosure.
Figure 10:
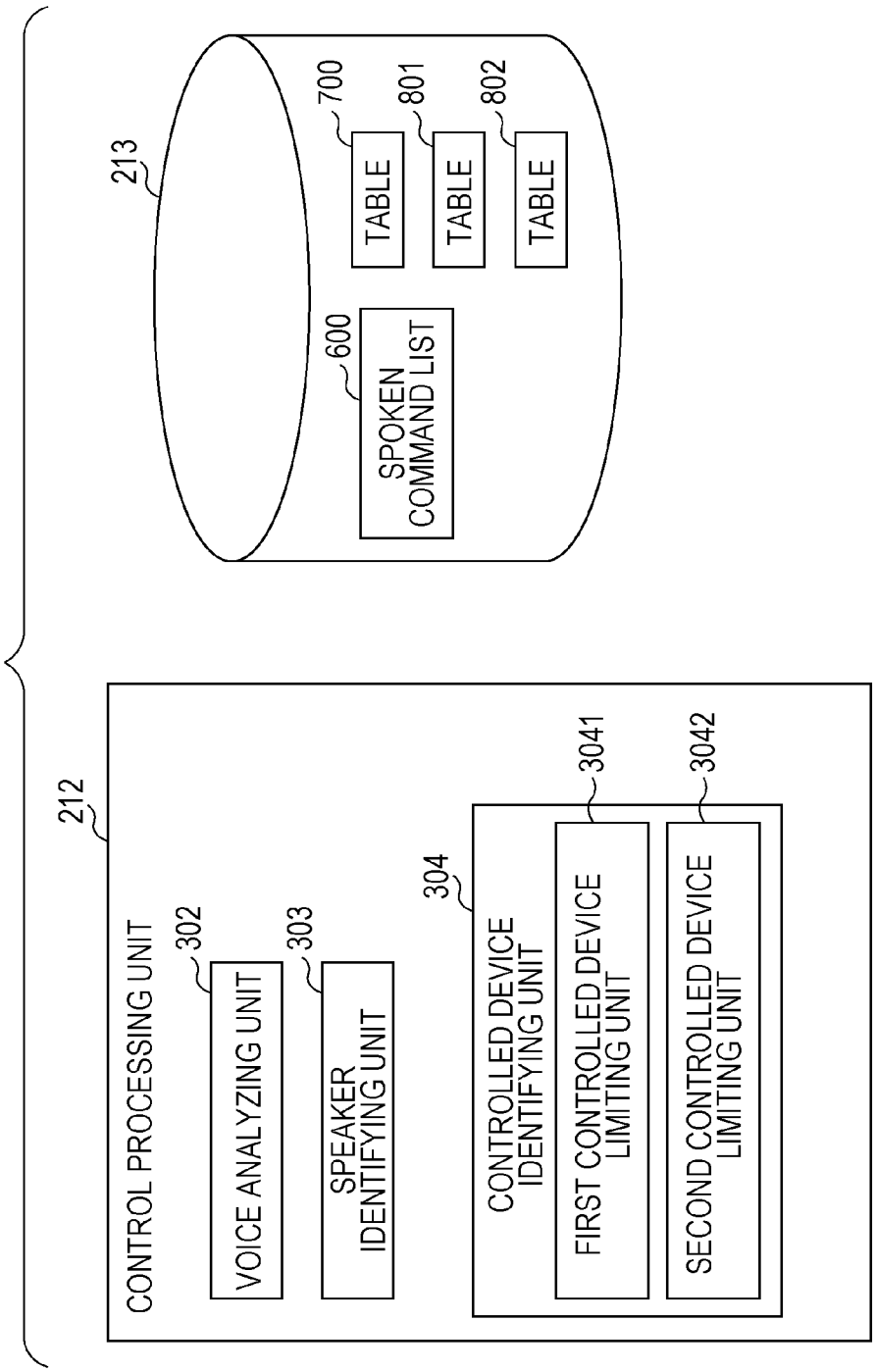
FIG. 10 is a diagram illustrating the configuration of a control processing unit and database according to the first embodiment of the present disclosure.

An example of the flow of operations of the voice recognition system according to the first embodiment will be described with reference to FIGS. 8 and 9. FIG. 8 is a sequence diagram for describing the operations regarding a first device in the voice recognition system according to the first embodiment of the present disclosure. FIG. 9 is a sequence diagram for describing the operations regarding a second device in the voice recognition system according to the first embodiment of the present disclosure. FIG. 10 is a diagram illustrating the configuration of a control processing unit and database according to the first embodiment of the present disclosure.

Note that the control processing unit 212 of the control device 111 of the voice recognition system which will be described below includes the voice analyzing unit 302, speaker identifying unit 303, and controlled device identifying unit 304, as illustrated in FIG. 10. The database 213 of the control device 111 includes a spoken command list 600 and multiple tables (table 700, table 801, table 802), also illustrated in FIG. 10.

First, in step S501 the sound collecting device 103 acquires voice information. The timing at which the sound collecting device 103 acquires voice information is not restricted in the present voice recognition system. The sound collecting device 103 may acquire voice information at all times, or may acquire voice information at present timings or intervals. For example, the sound collecting device 103 may acquire voice information at all times in the space where it is installed, and output the acquired voice information to the control device 111 when a frequency band of a human voice has been detected within the acquired voice information.

Also, the sound collecting device 103 may detect a particular first word when detecting a frequency band of a human voice within the acquired voice information, and then detect another second word following the detected particular first word as the voice information. For example, in a case where the first word is "voice recognition", the speaker utters the second word following the first words, such as in "voice recognition, raise temperature". Accordingly, whether or not the acquired voice information is a spoken command can be distinguished. Alternatively, the control device 111 may perform distinguishing of whether a spoken command or not, instead of the sound collecting device 103.

Now, the voice information which the sound collecting device 103 acquires includes various noises other than the speech which the speaker has uttered. Accordingly, the sound collecting device 103 may include a noise removal unit which removes noise included in the voice information. Alternatively, the control device 111 may include a noise removal unit instead of the sound collecting device 103 having the noise removal unit.

Note that the processing in step S501 corresponds to the processing of step S301 in FIG. 7.

Next, in step S502 the sound collecting device 103 outputs the acquired voice information to the control device 111. In a case where the configuration of the voice recognition system is such as illustrated in FIG. 1A for example, when outputting voice information the sound collecting device 103 may directly output the voice information by the sound collecting device 103 and the control device 111 being connected by a wired connection. In a case where the sound collecting device 103 has a communication unit for connecting to a network, the sound collecting device 103 may transmit the voice information to the control device 111 over the network. Alternatively, the sound collecting device 103 may transmit the voice information to the control device 111 via the home gateway 102. Further, the timing at which the voice information is output to the control device 111 is not restricted in particular. In a case where the sound collecting device 103 acquires the voice information at all times, for example, the voice information may be recorded for a predetermined amount of time, with the sound collecting device 103 outputting the recorded voice information to the control device 111 only in a case where a frequency band of a human voice has been detected within the acquired voice information.

Next, in step S503, the voice analyzing unit 302 of the control processing unit 212 of the control device 111 analyzes the acquired voice information, and obtains a spoken command. A known method may be used for speech analysis. Conceivable methods include, for example, analyzing the acquired voice information, analyzing which of the spoken commands in the spoken command list 600 registered beforehand is approximated thereby, and thus determining a spoken command, and so forth. Examples of preregistered spoken commands include operation instructions for a device, such as "on", "off", "up", "down", and so forth. In a case where the voice analyzing unit 302 analyzes the voice information, and the result thereof is that there is no word matching the voice information in the spoken command list 600, the flow does not have to advances to the processing in the subsequent step S504. Note that the processing in step S503 corresponds to the processing of step S302 in FIG. 7.

Next, in step S504 the speaker identifying unit 303 of the control processing unit 212 of the control device 111 identifies speaker information relating to the speaker who has uttered the voice information from the acquired voice information. In this arrangement here, the speaker identifying unit 303 of the control device 111 compares the acquired voice information with voice information registered in the table 700 of the database 213, and estimates general speaker information, for example.

Figure 11:
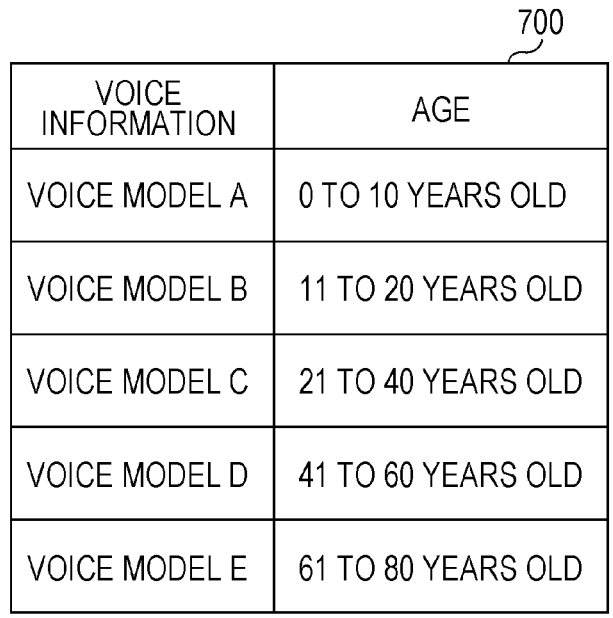
FIG. 11 is a diagram illustrating an example of a table recorded in the database, showing the relationship between voice information, and estimated age.

FIG. 11 is a diagram illustrating an example of the table 700 representing the relationship between the voice information registered in the database 213 and the estimated age. Voice information (voice modes) corresponding to five stages of age ranges are registered in the database 213, as illustrated in FIG. 11. A voice model here means a distinguishing model created using features of voices of an indeterminate number of speakers for each age. A voice model contains features indicating speaker properties of the voices of each age. For example, a voice model A is created by extracting features from the speech of an indeterminate number of people zero to ten years old, learning the extracted features using some sort of standard, and forming a model.

The method for modeling the voice information is not restricted in particular. It is known that the basic frequencies of vocal chord vibrations and vocal-tract properties generally differ by gender and age, such as men and women, children and adults, and so on. An arrangement may be made in light of these differences to model the basic frequencies extracted from the voice information of each age and gender regarding which classification is desired, or features of vocal-tract properties may be extracted and the extracted features may be modeled by a statistical approach by mechanical learning or the like, for example. While an example has been illustrated in the present embodiment where a database is formed by dividing into five age groups, this is not restrictive. For example, it is sufficient if voice information is modeled corresponding to at least two stages of age groups, such as children (e.g., zero to ten years old), and all other adults, and stored as a database. Information relating to voice information (voice models) and age may be correlated as with the table 700 in FIG. 11, or voice information (voice models) and gender or other information may be correlated. Note that the processing in step S504 corresponds to the processing of step S303 in FIG. 7.

Next, in step S505, the controlled device identifying unit 304 of the control processing unit 212 of the control device 111 identifies the device to be controlled. A method of identifying a device to be controlled from identified voice information (voice models) and an acquired spoken command will be described as one example of a method for identifying a device to be controlled. Note that the method for identifying a device to be controlled is not restricted to the following method, and that a method of identifying a device to be controlled from identified speaker information alone, or a method of identifying a device to be controlled from a combination of identified speaker information and other information, for example, may be conceived. The controlled device identifying unit 304 may include a first controlled device limiting unit 3041 and a second controlled device limiting unit 3042, as illustrated in FIG. 10.

Figure 12:
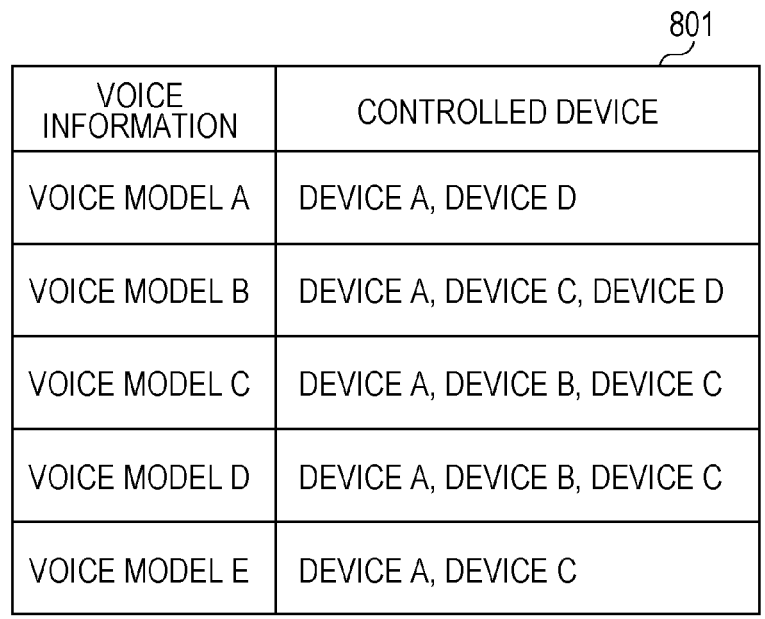
FIG. 12 is a diagram illustrating an example of a table recorded in the database, showing the relationship between voice models and devices to be controlled.

FIG. 12 is a diagram illustrating an example of the table 801 recorded in the database 213, showing the relationship between voice models and devices to be controlled. The first controlled device limiting unit 3041 uses the table 801 in the database 213 shown in FIG. 12 to restrict devices to be controlled, based on the speaker information (voice models A through D) identified by the speaker identifying unit 303. Note that in FIG. 12, device A is a television, device B is a gas cookstove burner, device C is an air conditioner, and device D is a children's toy, for example. In a case where the speaker identifying unit 303 has identified that the age of a speaker is zero to ten years old (voice model A), as shown in table 801, the controlled devices are restricted to device A (television) and device D (children's toy). In a case where the speaker identifying unit 303 has identified that the age of a speaker is 11 to 20 years old (voice model B), the controlled devices are restricted to device A, device C, and device D. In the same way, in a case where the speaker identifying unit 303 has identified that the age of a speaker is 21 to 40 years old (voice model C), the controlled devices are restricted to device A, device B, and device C. Other ages are restricted regarding the controlled devices in the same way, as illustrated in FIG. 12. While table 801 correlates voice models and controlled devices, the present disclosure is not particularly restricted to this, and age and controlled devices may be correlated.

Figure 13:
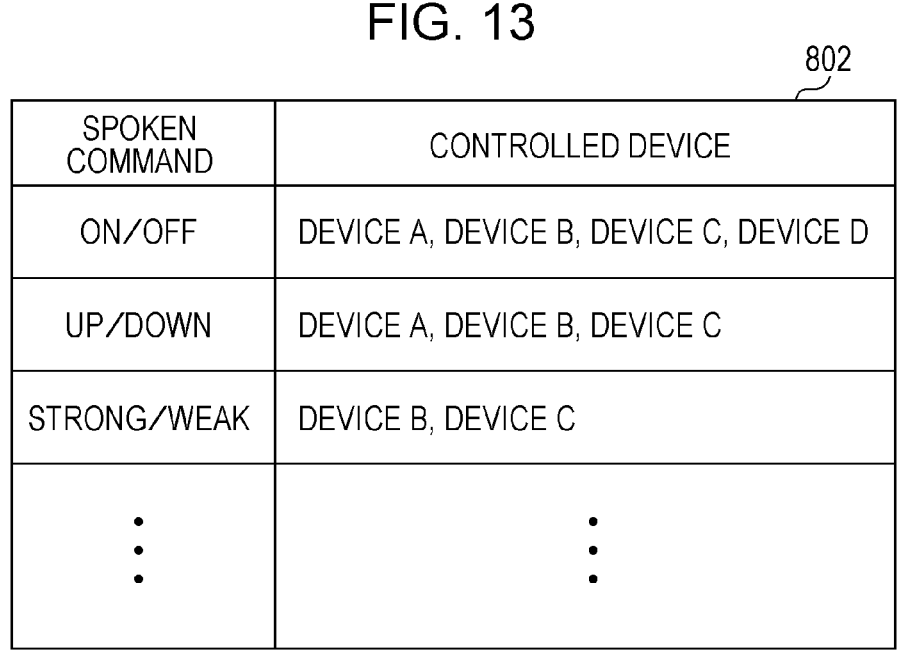
FIG. 13 is a diagram illustrating an example of a table recorded in the database, showing the relationship between spoken commands and devices to be controlled.

FIG. 13 is a diagram illustrating an example of the table 802 recorded in the database 213, showing the relationship between spoken commands and devices to be controlled.

The second controlled device limiting unit 3042 uses the table 802 in the database 213 shown in FIG. 13 to restrict devices to be controlled, based on the spoken commands obtained by the voice analyzing unit 302. For example, in a case where the spoken commands are "on" and "off", the controlled devices are restricted to the device A (television), device B (gas cookstove burner), device C (air conditioner), and device D (children's toy). On the other hand, in a case where the spoken commands are "up" and "down", for example, the controlled devices are restricted to the device A (television), device B (gas cookstove burner), and device C (air conditioner).

Now, in a case where the speaker identifying unit 303 has classified the voice model A, and the voice analyzing unit 302 has obtained the spoken command "up", for example, the device to be controlled is identified as the device A (television) out of the multiple devices 101, restricted by both the first controlled device limiting unit 3041 and the second controlled device limiting unit 3042.

Thus, the controlled device identifying unit 304 references each of the table 801 (first table) that stores speaker information correlated with a candidate device which is a candidate of a device to be controlled, and the table 802 (second table) that stores spoken commands correlated with a candidate device which is a candidate of a device to be controlled, and identifies a candidate device that matches both the table 801 and the table 802 as a device to be controlled. Also, in a case where there is no candidate device that matches both the table 801 (first table) and the table 802 (second table), the controlled device identifying unit 304 may make notification to the effect that there is no device to be controlled. Note that the processing in step S505 corresponds to the processing of step S304 in FIG. 7.

Next, in step S506 the communication unit 211 of the control device 111 transmits the spoken command to the communication unit 201 of the device to be controlled. As described above, in a case where the device to be controlled has been identified as device A in step S505, the communication unit 211 transmits the spoken command "up" to the television, which is the device A, as illustrated in FIG. 8. On the other hand, in a case where the device to be controlled has been identified as device B in step S505, the communication unit 211 transmits the spoken command to the device B as illustrated in FIG. 9.

Then in step S507, the control processing unit 202 of controlled device controls operations in accordance with the received spoken command.

Figure 14:
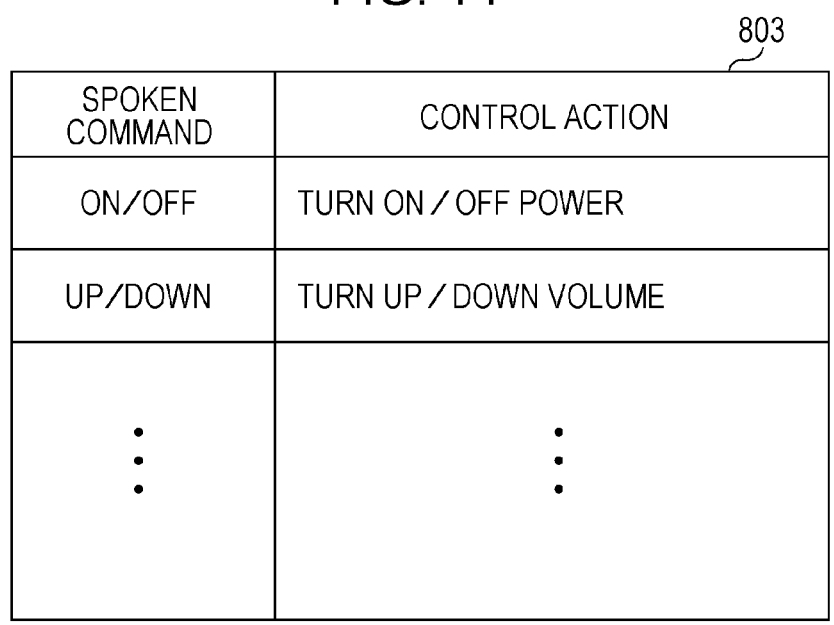
FIG. 14 is a diagram illustrating an example of a table showing the relationship between spoken commands stored in memory of a device, and control contents.

FIG. 14 is a diagram illustrating an example of a table 803 in which spoken commands stored in memory of a device, and contents of control, are correlated. Each device has a table 803 such as illustrated in FIG. 14. For example, in a case where the spoken command "up" is input to the device A, the control processing unit 202 controls the speaker 205 to raise the volume setting value by a predetermined value.

According to the voice recognition system of the first embodiment described above, a device to control with regard to a spoken command from the speaker can be identified from information of the age and so forth of the speaker, and the spoken command. Accordingly, conventional input operations to identify a device to be controlled are unnecessary, thereby improving ease of use of the user. Also, the problem of conventional voice recognition systems where anybody could operate all devices by voice can be solved. For example, a case where a child could operate a device such as a gas cookstove by voice can be prevented.

While an example where the control processing unit 212 of the control device 111 includes the voice analyzing unit 302, speaker identifying unit 303, and controlled device identifying unit 304, has been described in the first embodiment, this is not restrictive. The control processing unit 202 of any of the multiple devices 101 may include any or all of the voice analyzing unit 302, speaker identifying unit 303, and controlled device identifying unit 304. Further, the server 121 which the service provider owns may include any or all of the voice analyzing unit 302, speaker identifying unit 303, and controlled device identifying unit 304. In this case, the data center operator 110 stores acquired information and transmits this to the service provider. Alternatively, there are cases where the data center operator 110 does not exist.

While the voice information identified in step S303 may be general information minimally necessary for determining whether or not to accept control of the device by voice, the detailed speaker can be identified from the voice information if a table has been registered beforehand in which individuals in each group and voice models are correlated. For example, the speaker can be identified in detail, such as which family member the speaker is, whether the father or the mother, or whether an older sister or a younger sister, for example. Accordingly, even if a speaker other than speakers belonging to a group registered beforehand speaks the spoken command, control of devices can be prevented. Thus, devices in the group (a home or the like) can be prevented from being controlled from someone from the outside.

Also, the usage frequency of devices by each user can be counted by storing databases for each group set beforehand. Accordingly, the controlled device identifying unit 304 may identify a device which a speaker who has uttered a spoken command uses with high frequency, to be identified as the device to be controlled with priority. That is to say, the database 213 may store table correlating speaker information and usage history of a device by the speaker corresponding to the speaker information. The controlled device identifying unit 304 also may reference this table and identify a device to be controlled based on the usage history of the device by the speaker corresponding to the speaker information, and a spoken command. Accordingly, a situation where a user controls a device which was not intended can be prevented. Details of a table correlating with individuals in each group will be described in a second embodiment as well.

The controlled device identifying unit 304 may also identify a device to be controlled using, along with history of usage frequency, information relating to the time-of-day at which the device was used. Accordingly, a device which the speaker uses frequently at the time-of-day at which the speaker has uttered the spoken command can be identified as the device to be controlled. Accordingly, the precision of identifying the device to be controlled can be further improved.

The controlled device identifying unit 304 may also further use location information of the speaker and the device to identify the device to be controlled. That is to say, the controlled device identifying unit 304 may acquire speaker location information indicating the location of the speaker, and device location information indicating the location of each of the multiple devices, and identify the device to be controlled based on the spoken command, speaker information, speaker location information, and device location information.

For example, the controlled device identifying unit 304 may, after multiple controlled device candidates have been identified based on the spoken command and speaker information, identify the controlled device candidate closest to the speaker as being the device to be controlled, based on the relationship between the location of the speaker and the location of the identified multiple controlled device candidates. For example, Global Positioning System (GPS) information or the like may be used as location information. Also, the positional relation between the sound collecting device 103 and the devices, and the positional relation between the sound collecting device 103 and the speaker may be measured based on the voice information acquired by the sound collecting device 103. If an arrangement is made where the multiple devices 101 have a microphone 204 and speaker 205, and the devices can exchange information with each other, the positional relationship among the devices, and the location of the speaker, can be identified in further detail.

Also, an arrangement may be made where, in step S305, at the time of controlling the identified controlled device, the control processing unit 202 controls the device to be controlled in accordance with the identified speaker. For example, in a case where a speaker identified to be voice model A (zero to ten years old) in table 700 controls a device A (television) by spoken command, the display unit 206 of the device A may display text saying "stay at least 1 meter away when watching television", and the speaker 205 may output audio saying "stay at least 1 meter away when watching television". Also, in a case where a speaker identified to be voice model E (61 to 80 years old) controls a device C by spoken command, the speaker 205 may output a more detailed audio guide relating to how to operate. That is to say, the control method of the device and the control results of the device in step S305 may be changed in accordance with the information relating to the speaker.

The tables illustrated in FIGS. 12 and 13 may be set to a default setting beforehand by the manufacturer, and also may be edited by the user. In this case, a user interface (UI) is preferably constructed for the user to edit each table.

Figure 15:
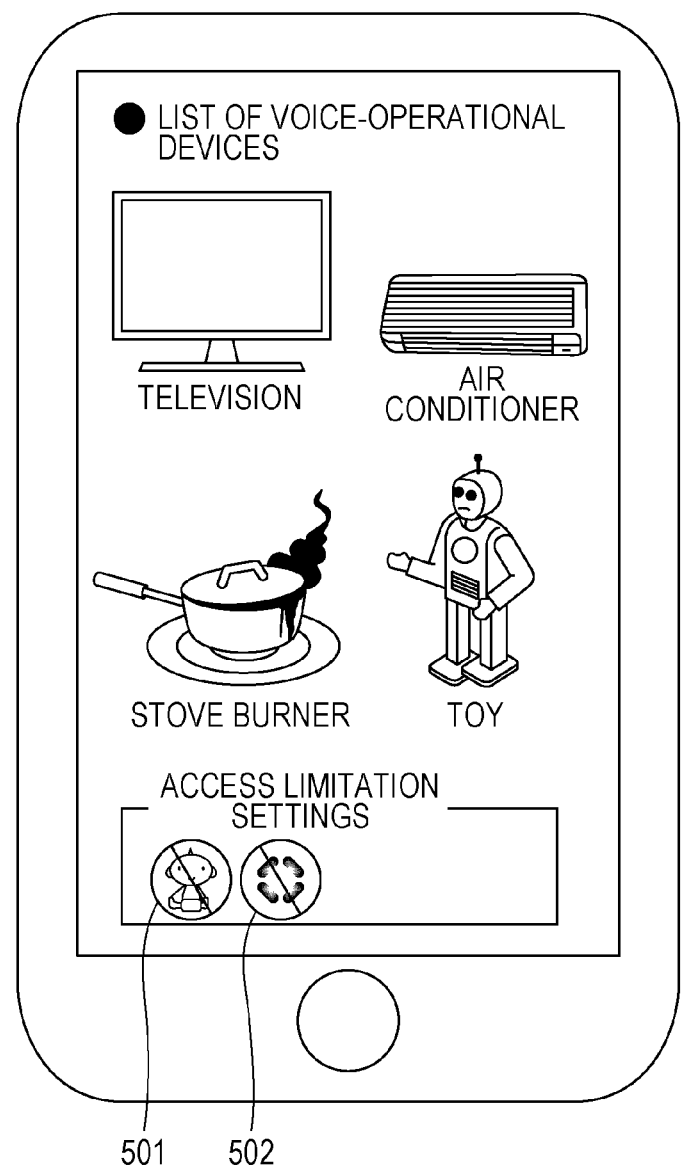
FIG. 15 is a diagram illustrating an example of a display screen displaying a list of devices which can be operated by voice.
Figure 16:
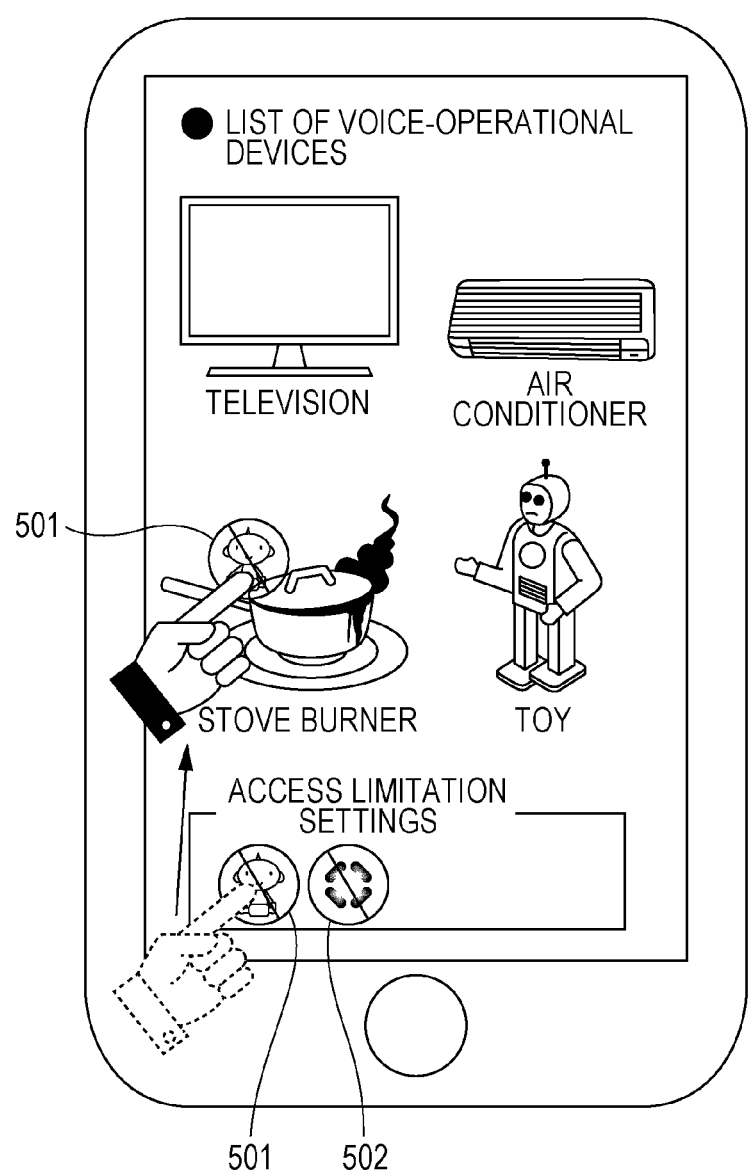
FIG. 16 is a diagram for describing operations of setting speakers which can operate by voice for each device.
Figure 17:
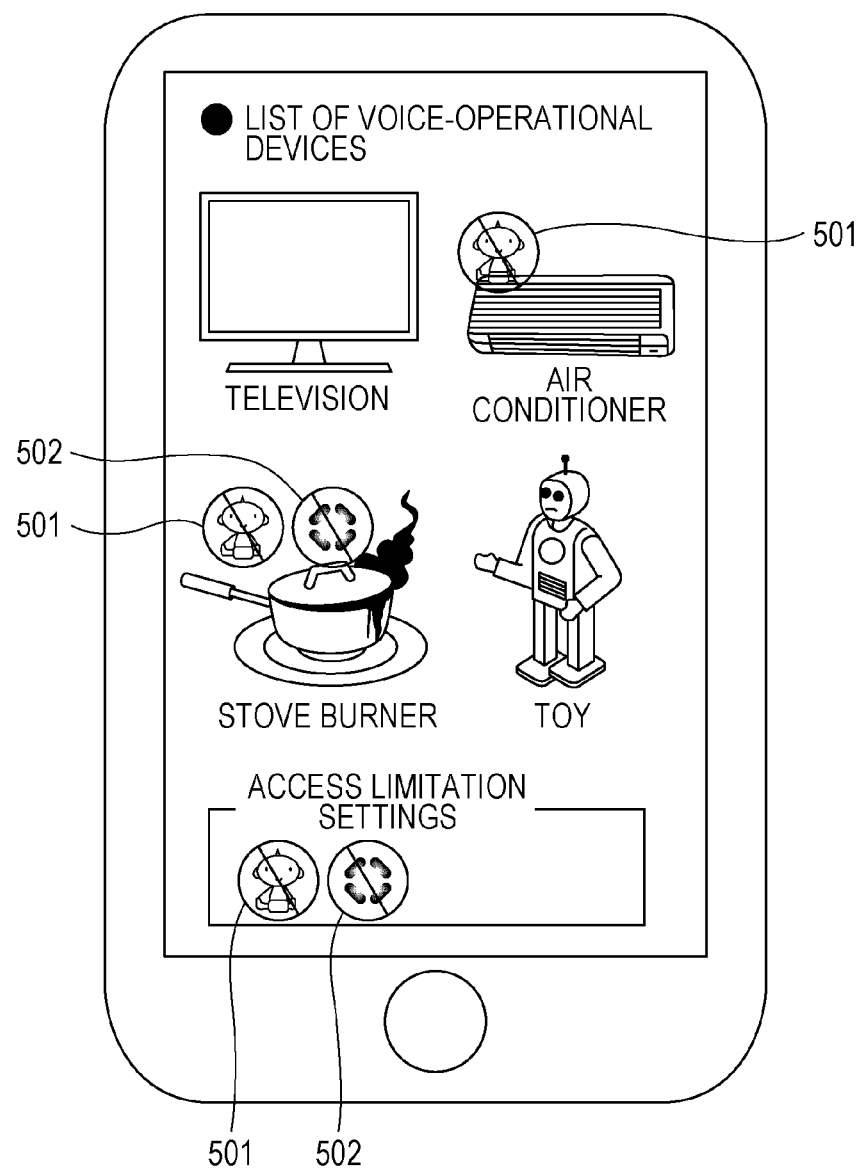
FIG. 17 is a diagram illustrating an example of a display screen displayed at the time of setting speakers which can operate by voice for each device.

FIG. 15 is a diagram illustrating an example of a display screen displaying a list of devices which can be controlled by voice, FIG. 16 is a diagram for describing operations of setting speakers which can operate by voice for each device, and FIG. 17 is a diagram illustrating an example of a display screen displayed at the time of setting speakers which can operate by voice for each device.

FIGS. 15 through 17 represent a UI for the user to set the tables. For example, a list of devices which are voice-operational is displayed on a smartphone screen, as illustrated in FIG. 15. Also, icons 501 and 502 for restricting usage of deices by particular users are displayed at the lower part of the screen. The icon 501 is an icon for restricting operation by speakers zero to ten years old corresponding to the voice model A, while the icon 502 is an icon for restricting operation by speakers 61 to 80 years old corresponding to the voice model E. The display unit displaying the screen is configured from a touch panel display or the like. The icons 501 and 502 are dragged and dropped onto the object device by the user, as illustrated in FIG. 16. Accordingly, the control processing unit 212 changes the device to be controlled that is correlated to the voice model corresponding to the icon in the table 801.

Finally, in the example illustrated in FIG. 17, the device B (gas cookstove burner) is set as a device which cannot be operated by spoken command by speakers in the voice model A (zero to ten years old) and speakers in the voice model E (61 to 80 years old). Also, the device C (air conditioner) is set as a device which cannot be operated by spoken command by speakers in the voice model A (zero to ten years old).

Thus, the control processing unit 212 of the control device 111 controls the display device (e.g., smartphone) which displays information relating to multiple devices 101 controlled based on voice by a speaker. The control processing unit 212 controls the display device so as to display a list of first information relating to the multiple devices which can be controlled by voice. The control processing unit 212 also controls the display device to display second information indicating that control of devices by voice is not accepted with regard to particular speakers, so as to be displayed near the first information corresponding to a device regarding which control is not to be accepted.

Also, displayed on the display screen of the display device are first information and second information displayed at a different position from that of the first information. The control processing unit 212 controls the display device so as to display the second information nearby the first information by the user touching a display region displaying the second information on the display screen of the display device, the second information being dragged toward the first information, and the second information being dropped on the first information. Also, in a case where the second information is displayed nearby the first information, the control processing unit 212 changes settings regarding a particular speaker so that control by voice of a device corresponding to the first information is not accepted.

Also, the voice recognition system may have an output unit to output a reason why the controlled device identifying unit 304 has identified the device to be controlled. For example, in a case where tables are set such as in FIGS. 12 and 13, and a speaker of voice model E utters a spoken command "today", the device to be controlled is automatically identified as being the device B (air conditioner). At this time, the communication unit 211 of the control device 111 may transmit a control command to output the audio "the only device you can control by spoken command is the air conditioner, so the air conditioner will be controlled" from the speaker 205. Accordingly, the speaker can comprehend why the device B has been automatically controlled, thereby reducing dissatisfaction.

Also, the voice recognition system may have a controlled device notification unit to visually notify a speaker of controlled device at the point that the speaker has been identified. For example, in a case where a speaker in a room where the sound collecting device 103 is installed has been identified as being voice model A, device A and device D are automatically identified as candidates for controlled devices. At this time, the control device 111 may cause light-emitting portions (omitted from illustration in FIG. 3) provided to the device A and device D to emit light. Thus, the speaker can visually comprehend devices which can be controlled by spoken commands.

Also, in a case where an identified speaker attempts to control by spoken command a device which is not a device to be controlled, the control device 111 may effect control so that the speaker 104 outputs audio guidance that "that device is not an object of control". For example, in a case where tables are registered such as in FIGS. 12 and 13, and the identified speaker of voice model A utters a spoken command "today", there is no device to be controlled. Accordingly, in a case where there is not controlled device corresponding to the spoken command, the communication unit 211 of the control device 111 may transmit a control command so that the speaker 205 outputs audio guidance that "that device is not an object of control".

Second Embodiment
Underlying Knowledge Forming Basis of the Second Embodiment

The second embodiment assumes a system where not only are multiple devices controlled by voice, but also where virtual conversations can be held with the devices or the house by voice, and goods are purchased. In a case where a user is attempting to cook according to a recipe registered in the system, for example, an arrangement where the system side can prompt the user to purchase ingredients that are lacking, and the user can instruct purchasing of the lacking ingredients by voice, a system can be provided with high usability and value to both the user and service provider.

It should be noted though, that this would allow even a prowler who has broken into the house, for example, to purchase goods by voice input. Also, small children would be able to purchase expensive goods. That is to say, anyone would be able to purchase goods. Conventionally, there is no method established to perform user authentication when executing settlement of a purchase by way of voice recognition system, so whether the speaker attempting to purchase the goods by voice cannot be identified whether the user registered beforehand or not. Accordingly, a system needs to be constructed where users can be authenticated and safely purchase goods.

A voice recognition system which solves the above problem is provided in the second embodiment. Description of the second embodiment will be made primarily regarding configurations different from those of the first embodiment. Note that the second embodiment may use the configuration of the first embodiment in parallel. The overall configuration of the voice recognition system, the configuration of the device 101a, the configuration of the control device and so forth, are the same as in FIGS. 1A through 5, so description will be omitted.

Functional Configuration of Voice Recognition System

Figure 18:
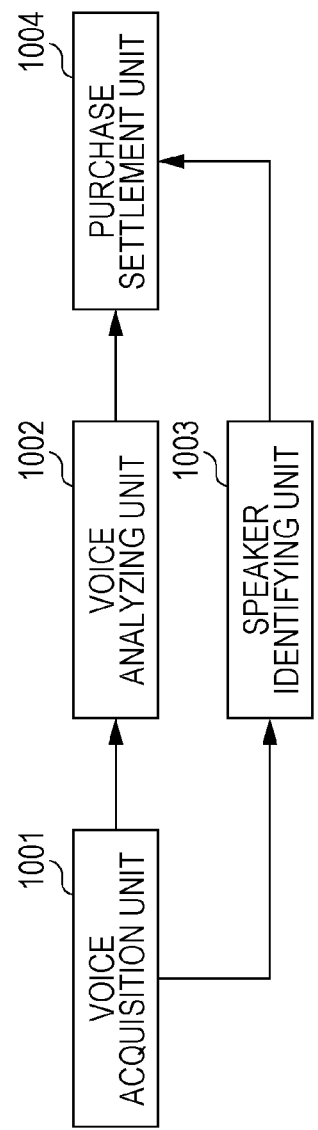
FIG. 18 is a diagram illustrating the functional configuration of a voice recognition system according to a second embodiment of the present disclosure.

FIG. 18 is a diagram illustrating the functional configuration of a voice recognition system according to the second embodiment of the present disclosure. The voice recognition system includes a voice acquisition unit 1001, a voice analyzing unit 1002, a speaker identifying unit 1003, and a purchase settlement unit 1004, as illustrated in FIG. 18.

The configurations of the voice acquisition unit 1001, voice analyzing unit 1002, and speaker identifying unit 1003 are the same as the voice acquisition unit 301, voice analyzing unit 302, and speaker identifying unit 303 according to the first embodiment, so description will be omitted. Note that in the second embodiment, however, the speaker information which the speaker identifying unit 1003 identifies is detailed speaker information. Detailed speaker information will be described later.

The purchase settlement unit 1004 performs purchase settlement of the product based on spoken commands acquired by the voice analyzing unit 1002, and speaker information identified by the speaker identifying unit 1003. Details of the purchase settlement method will be described later. The purchase settlement unit 1004 is realized at the server 121 of the service provider 120. Detailed configuration of the server 121 will be described later. Note that the purchase settlement unit 1004 may be realized at the control device 111 of the data center operator 110 as well.

Flowchart of Voice Recognition System

Figure 19:
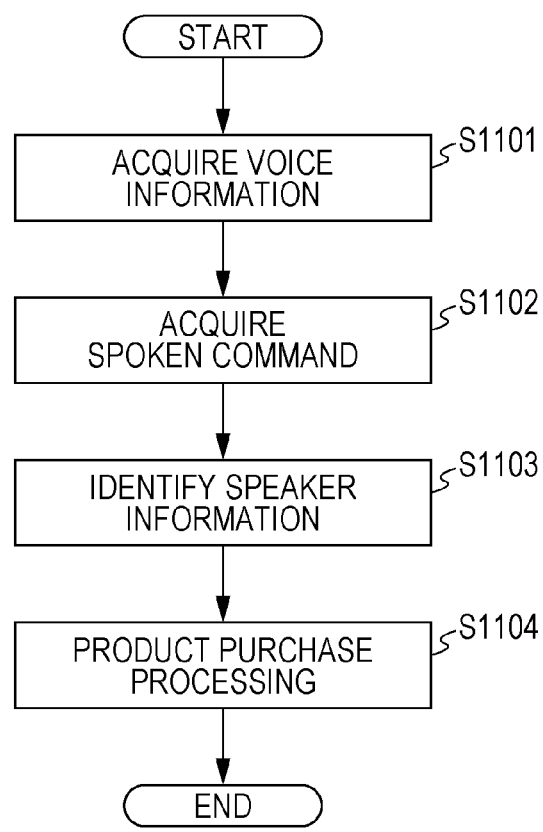
FIG. 19 is a flowchart illustrating the operations of the voice recognition system according to the second embodiment of the present disclosure.

Hereinafter, the flow of processing of the purchase settlement method according to the present voice recognition system will be described with reference to FIG. 19. FIG. 19 is a flowchart illustrating operations of the voice recognition system according to the second embodiment of the present disclosure.

First, in step S1101, the voice acquisition unit 1001 acquires voice information of the speaker.

Next, in step S1102, the voice analyzing unit 1002 analyses the voice information acquired by the voice acquisition unit 1001 and acquires a spoken command. The voice analyzing unit 1002 also determines whether or not the spoken command is a spoken command relating to purchase settlement.

Next, in step S1103 the speaker identifying unit 1003 identifies speaker information relating to the speaker who has uttered the acquired voice information, based on the voice information acquired by the voice acquisition unit 1001. In a case where the spoken command is a spoken command relating to purchase settlement, the speaker identifying unit 1003 identifies the speaker information relating to the speaker who has uttered the acquired voice information, based on the acquired voice information.

Next, in step S1104, the purchase settlement unit 1004 performs purchase settlement of goods, based on the spoken command acquired by the voice analyzing unit 1002 and the speaker information identified by the speaker identifying unit 1003. The purchase settlement unit 1004 references a table in which is correlated speaker information of speakers permitted to perform purchase settlement, and information necessary for purchase settlement, determines whether the identified speaker information is speaker information permitted to perform purchase settlement, and in a case where determination is made that the identified speaker information is speaker information permitted to perform purchase settlement, purchase settlement processing is performed using the spoken command and information necessary for purchase settlement.

Operation Example of Voice Recognition System

Figure 20:
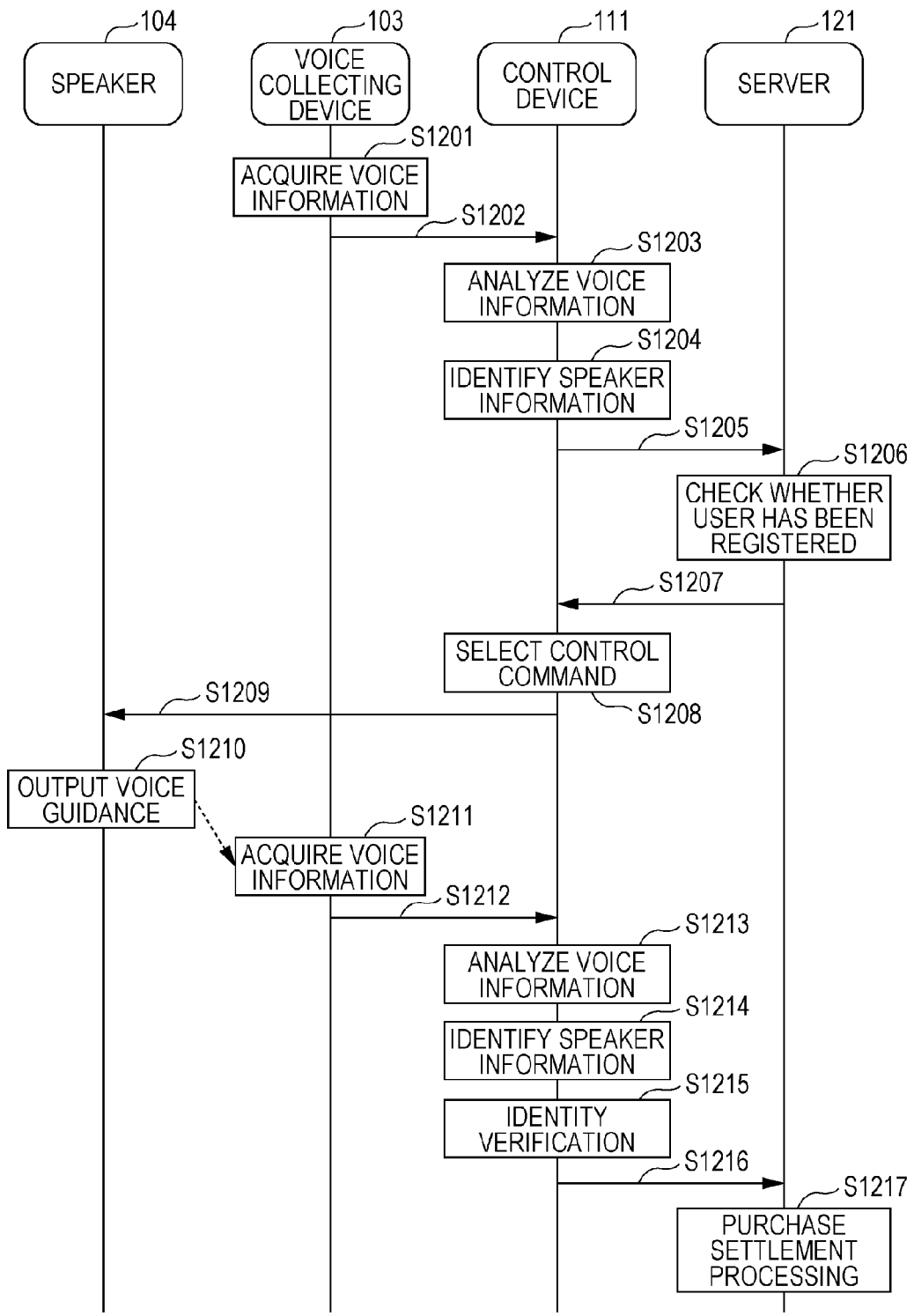
FIG. 20 is a sequence diagram for describing purchase settlement processing by the voice recognition system according to the second embodiment of the present disclosure.
Figure 21:
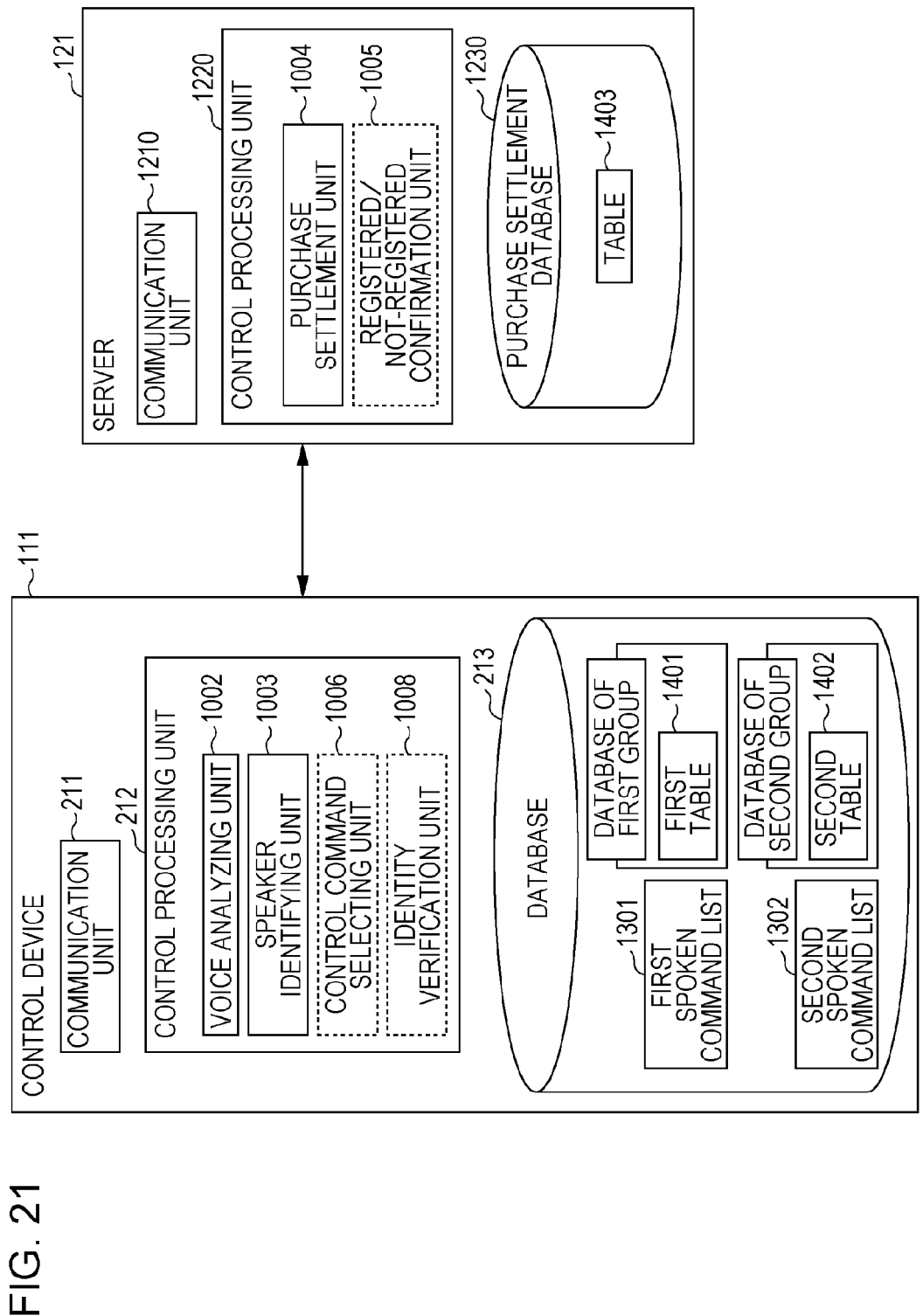
FIG. 21 is a diagram illustrating the configuration of a control device and server according to the second embodiment of the present disclosure.

An example of the flow of operations of the voice recognition system according to the second embodiment will be described with reference to FIG. 20. FIG. 20 is a sequence diagram for describing purchase settlement processing by the voice recognition system according to the second embodiment of the present disclosure. FIG. 21 is a diagram illustrating the configuration of a control device and server according to the second embodiment of the present disclosure.

Note that in the voice recognition system described below, the control processing unit 212 of the control device 111 includes the voice analyzing unit 1002 and the speaker identifying unit 1003, as illustrated in FIG. 21. The control processing unit 212 may further include a control command selecting unit 1006 and an identity verification unit 1008. The database 213 of the control device 111 also has a first spoken command list 1301, a second spoken command list 1302, and tables (first table 1401 and second table 1402) correlated with each group (home or company), as illustrated in FIG. 21.

The server 121 of the service provider also has a communication unit 1210, a control processing unit 1220, and a purchase settlement database 1230. The control processing unit 1220 also has the purchase settlement unit 1004. The control processing unit 1220 may also have a registered/not-registered confirmation unit 1005. The purchase settlement database 1230 has a table 1403.

First, in step S1201, the sound collecting device 103 acquires voice information. Assumption will be made here that a spoken command instructing purchase of goods has been acquired. For example, voice information saying "purchase milk" is input to the sound collecting device 103. Note that the processing of step S1201 corresponds to the processing of step S1101 illustrated in FIG. 19.

Next, in step S1202, the sound collecting device 103 transmits the acquired voice information to the control device 111.

Next, in step S1203, the voice analyzing unit 1002 of the control processing unit 212 of the control device 111 analyzes the acquired voice information, and obtains a spoken command. The voice analyzing unit 1002 analyzes the voice information in the same way as in the first embodiment. The voice analyzing unit 1002 performs confirmation here regarding whether or not a word implying purchase settlement is included in the spoken command. The voice analyzing unit 1002 also performs confirmation regarding whether or not a word relating to a product which is the object of purchase is included in the spoken command.

For example, in a case where a spoken command "purchase milk" is input, the voice analyzing unit 1002 compares each of the word "milk" and the word "purchase" with the first spoken command list 1301 storing words meaning purchase beforehand. In this case, the word "purchase" exists in the first spoken command list 1301, so the voice analyzing unit 1002 adds information that this is a spoken command for purchase settlement. The voice analyzing unit 1002 also compares the word "milk" with the second spoken command list 1302 storing names of goods which can be purchased beforehand. If the word "milk" exists in the second spoken command list 1302, the voice analyzing unit 1002 sets milk as a product to be purchased. Note that the processing of step S1203 corresponds to the processing of step S1102 illustrated in FIG. 19.

Next, in step S1204, the speaker identifying unit 1003 of the control processing unit 212 of the control device 111 identifies speaker information relating to the speaker who has uttered the voice information, from the acquired voice information. The database 213 includes tables where detailed information of constituents of the groups is stored (first table 1401 and second table 1402). The first table 1401 stores voice information, age, and gender, of constituents of the first group, in a correlated manner. The second table 1402 stores voice information, age, and gender, of constituents of the second group, which is different from the first group, in a correlated manner.

FIG. 22 is a diagram illustrating an example of the first table 1401 showing the relationship between voice information recorded in the database 213, estimated age, and estimated gender. Voice information and detailed age and gender are correlated in the first table 1401. This voice information is the same as that described in the first embodiment. The speaker identifying unit 1003 identifies speaker information by comparing the voice information acquired in the processing in step S1201 with the voice information registered in the first table 1401.

The method of constructing the first table 1401 is not restricted in particular. For example, the control processing unit 212 may construct the first table 1401 by accepting initial settings from a user using a UI beforehand. Also, the control processing unit 212 may construct the first table 1401 may cause the speaker to input information relating to age, gender, and so forth, at any timing of the sound collecting device 103 acquiring voice information. Also, when the speaker registers information in the later-described purchase settlement database 1230, the control processing unit 212 may automatically copy information of the purchase settlement database 1230 to the first table 1401 after the speaker having registered the information in the purchase settlement database 1230. Note that the processing of step S1204 corresponds to the processing of step S1103 illustrated in FIG. 19.

Next, in a case where determination is made as the result of the analysis in step S1203 that the spoken command is a spoken command for purchase settlement, in step S1205 the communication unit 211 of the control device 111 transmits the identified speaker information to the communication unit 1210 of the server 121. Note that determination whether or not the spoken command is a spoken command for purchase settlement does not have to be made at this point. The communication unit 1210 of the server 121 receives the speaker information transmitted by the control device 111.

Next, in step S1206, the registered/not-registered confirmation unit 1005 of the control processing unit 1220 of the server 121 determines whether or not the speaker information identified in step S1204 is registered in the purchase settlement database 1230. The purchase settlement database 1230 includes a table 1403 storing information relating to users permitted to purchase goods in the voice recognition system.

FIG. 23 is a diagram illustrating an example of the table 1403 showing the relationship between user Nos., voice information, age, and credit card information, stored in a purchase settlement database 1230. In a case where voice information of a speaker identified in step S1204 exists in the table 1403, the registered/not-registered confirmation unit 1005 stores "registered" for the user registered/not-registered information. For example, a speaker which has been identified in step S1204 as voice information "001" in FIG. 22 does not exist in the table 1403, so the registered/not-registered confirmation unit 1005 stores "not registered" for the user registered/not-registered information, the flow does not advance to step S1207, and the flow ends. Alternatively, the registered/not-registered confirmation unit 1005 may create a control command to output audio guidance such as "there is no registration information", and transmit this to the speaker 104, instead of ending the flow. On the other hand, a speaker which has been identified in step S1204 as voice information "003" in FIG. 22 exists in the table 1403, so the registered/not-registered confirmation unit 1005 stores "registered" for the user registered/not-registered information, and the flow advances to step S1207.

Note that when determining whether a user is registered or not registered, precision of verification may be improved by determining not only a match between the voice information in table 1401 and voice information in table 1403, but also using matching of other information (e.g., age, gender, etc.).

Next, in step S1207 the communication unit 1210 of the server 121 transmits user registered/not-registered information to the communication unit 211 of the control device 111. The communication unit 211 of the control device 111 receives the user registered/not-registered information transmitted by the server 121.

Next, in step S1208, the control command selecting unit 1006 of the control processing unit 212 of the control device 111 selects a control command by which to control the speaker 104, based on the spoken command analyzed in step S1203. For example, in a case where a word in the spoken command indicating a product matching the spoken command list 1302 of goods which can be purchased which is an inexpensive product (milk here), the control command selecting unit 1006 selects (generates) a control command to output audio guidance of "Purchase settlement will be performed. Is it okay to purchase milk?" Also, in a case where a word indicating a product matching the spoken command list 1302 which is a relatively expensive product, the control command selecting unit 1006 selects (generates) a control command to output audio guidance of "Purchase settlement will be performed. Please say your password."

While description has been made here regarding the control command selecting unit 1006 changing the audio guidance to create depending on whether or not the product being purchased is inexpensive, but this is not restrictive. The control command selecting unit 1006 may constantly generate the same audio guidance regardless of whether or not the product being purchased is inexpensive. Also, whether or not the product being purchased is inexpensive is determined whether or not the product being purchased is more inexpensive than a predetermined price. The predetermined price may be set according to the user.

Next, in step S1209, the communication unit 211 of the control device 111 transmits the control command selected in step S1208 to the speaker 104. The speaker 104 receives the control command transmitted by the control device 111.

Next, in step S1210, the speaker 104 outputs the audio guidance based on the received control command. The audio guidance is that descried in step S1208. Thus, the speaker can be prompted to speak again.

The sound collecting device 103 then in step S1211 acquires the voice information of the speaker who has been prompted to speak again.

In step S1212, the sound collecting device 103 next transmits the acquired voice information to the control device 111.

In step S1213, the voice analyzing unit 1002 of the control device 111 then analyzes the audio again, and obtains a spoken command.

Next, in step S1214, the speaker identifying unit 1003 of the control device 111 identifies speaker information relating to the speaker who uttered the voice information, based on the acquired voice information.

Next, in step S1215 the identity verification unit 1008 of the control processing unit 212 determines whether the speaker information identified in step S1204 and the speaker information identified in step S1214 match, and if the two sets of speaker information match, determines that identity verification has been successful.

In step S1215, the identity verification unit 1008 may determine whether or not the spoken command analyzed in step S1213 is of a content affirming purchase of the product. In a case where determination is made there that the spoken command is of a content affirming purchase of the product, the identity verification unit 1008 determines that identity verification has been successful. On the other hand, in a case where determination is made that the spoken command is of a content denying purchase of the product (e.g., "no" or "don't buy"), the identity verification unit 1008 may end the flow. In this case, the control command selecting unit 1006 may select (generate) a control command to output audio guidance that "You seem to have no intent to purchase this product, so settlement processing will end" and transmit this to the speaker 104.

Next, in a case where identity verification has been successful in step S1215, in step S1216 the communication unit 211 of the control device 111 transmits information to the server 121 indicating that identity verification has been successful. In a case where determination is made that identity verification has been unsuccessful, the control command selecting unit 1006 may select (generate) a control command outputting an audio guidance that "identity cannot be verified" and transmit this to the speaker 104. The communication unit 1210 of the server 121 receives information transmitted by the control device 111 to the effect that identity verification has been successful.

Finally, the purchase settlement unit 1004 of the control processing unit 1220 of the server 121 performs purchase settlement processing to purchase the product specified by voice in step S1217. The user No., voice information, age, and credit card information are managed in a correlated manner in the table 1403 illustrated in FIG. 23. Accordingly, the purchase settlement unit 1004 can extract the credit card information of the corresponding speaker, and perform purchase settlement processing by communicating with a credit card company or the like via the communication unit 1210 in step S1217.

Thus, the voice recognition system according to the second embodiment identifies a speaker from the acquired voice information, and references a purchase settlement database stored in the server of the service provider, thereby determining whether or not the speaker has been registered as a user, and purchase settlement processing is performed. This does not impose troublesome verification work on the user. Further, the danger of anybody being able to purchase goods by speaking can be prevented. Further, reconfirming purchase of the goods enables identity verification to be performed. This enables purchase settlement processing to be performed with a high level of safety.

Note that the control processing unit 212 may include a location detecting unit to detect the current location of the speaker. After acquiring the voice information in step S1201, the location detecting unit may detect the location of the speaker, and then detect the location of speaker again in step S1215, and the identity verification unit 1008 may perform identity verification by confirming that the two speaker locations that have been detected are not different. Thus, even in a case where a speaker different from the speaker of whom the voice information was initially acquired interrupts and speaks at the purchase settlement intent confirmation timing (step S1211), the purchase settlement can be cancelled.

The technology described in the above forms may be realized by the following types of cloud service. However, the type of cloud service by which the technology of the forms described above can be realized is not restricted to this.

Service Type 1: In-House Data Center Type Cloud Service

Figure 24:
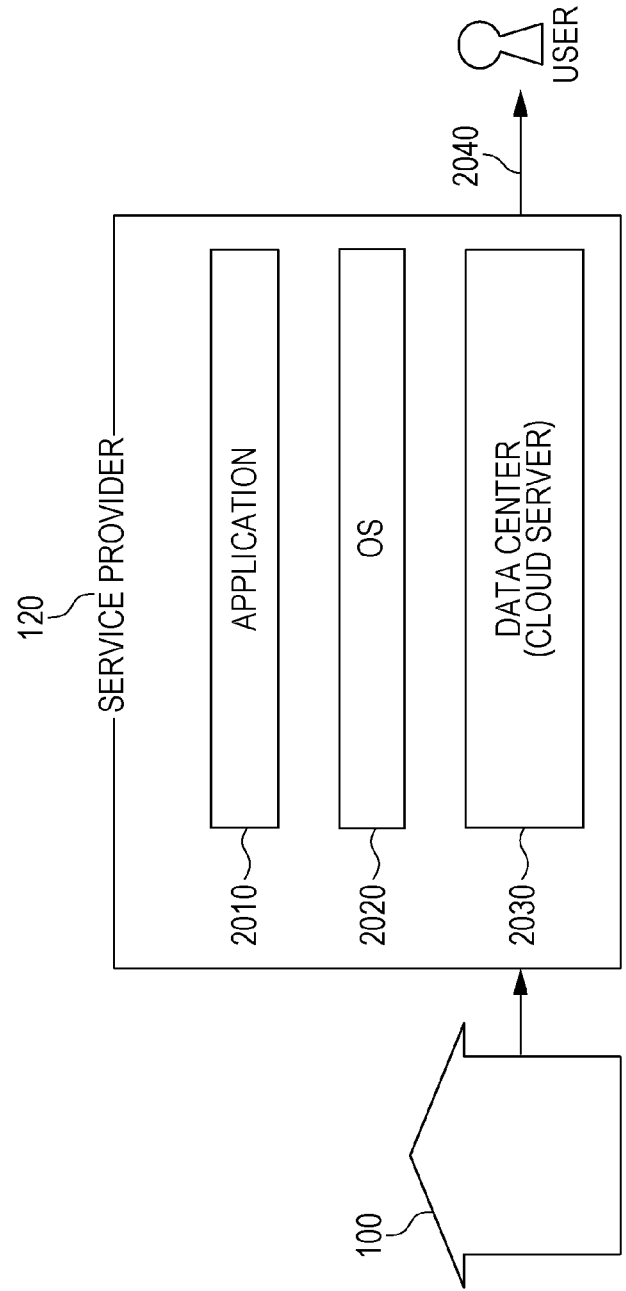
FIG. 24 is a diagram illustrating an overall image of service provided by a voice recognition system according to a type 1 service (in-house data center type cloud service)

FIG. 24 is a diagram illustrating the overall image of services which the voice recognition system provides in a service type 1 (in-house data center type cloud service). This type is a type where a service provider 120 obtains information from a group 100, and provides a user with service. In this type, the service provider 120 functions as a data center operator. That is to say, the service provider 120 has a cloud server (control device 111) to manage big data. Accordingly, the data center operator does not exist in this type.

In this type, the service provider 120 operates and manages the data center 2030 (cloud server). The service provider 120 also manages an operating system (OS) 2020 and applications 2010. The service provider 120 provides services (arrow 2040) using the OS 2020 and applications 2010 managed by the service provider 120.

Service Type 2: IaaS Usage Type Cloud Service

Figure 25:
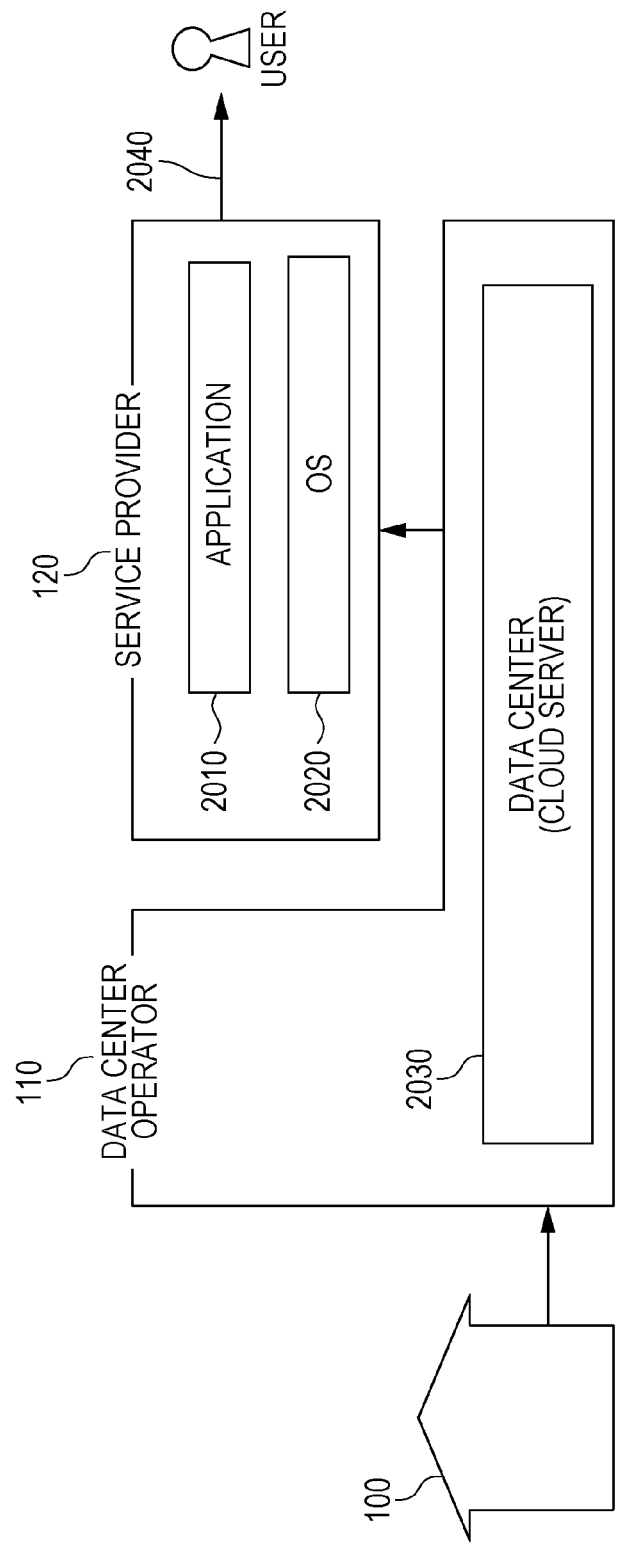
FIG. 25 is a diagram illustrating an overall image of service provided by a voice recognition system according to a type 2 service (IaaS usage type cloud service)

FIG. 25 is a diagram illustrating the overall image of services which the spoken dialogue system provides in a service type 2 (IaaS usage type cloud service). IaaS stands for "Infrastructure as a Service", and is a cloud service providing model where the base for computer system architecture and operation itself is provided as an Internet-based service.

In this type, the data center operator 110 operates and manages the data center 2030 (cloud server). The service provider 120 manages the OS 2020 and applications 2010. The service provider 120 provides services (arrow 2040) using the OS 2020 and applications 2010 managed by the service provider 120.

Service Type 3: PaaS Usage Type Cloud Service

Figure 26:
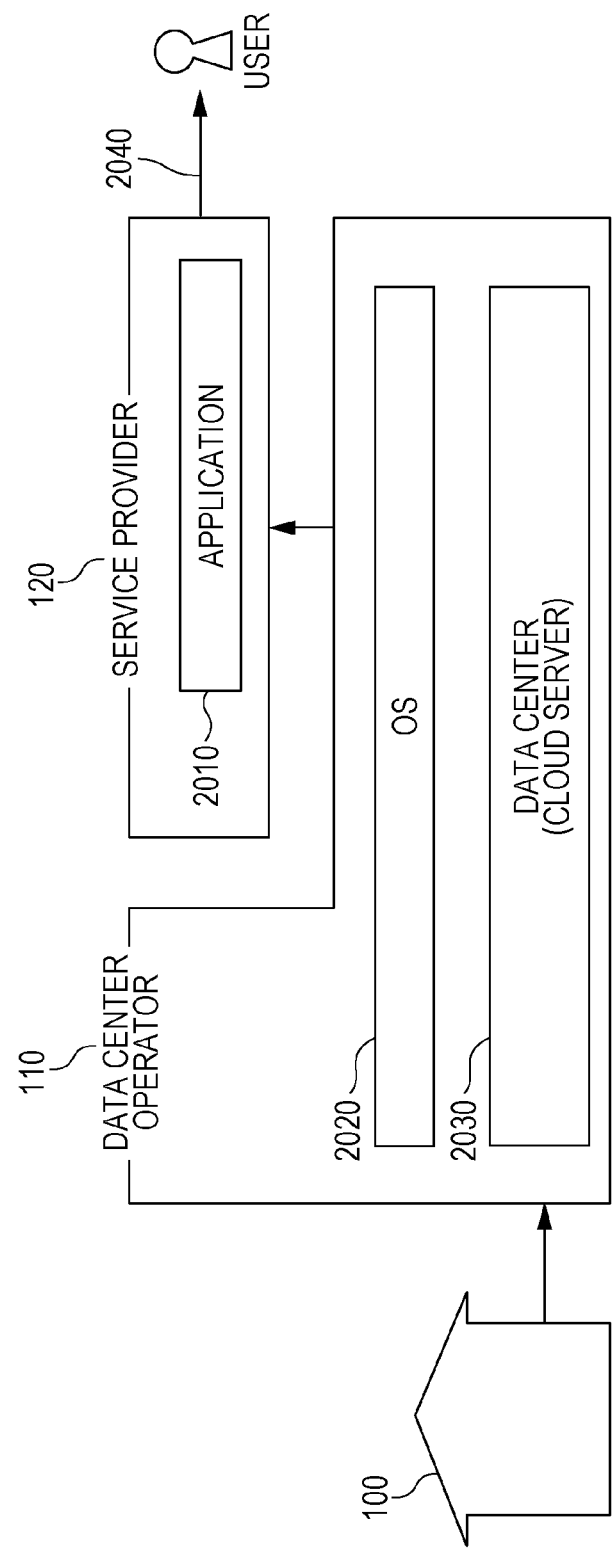
FIG. 26 is a diagram illustrating an overall image of service provided by a voice recognition system according to a type 3 service (PaaS usage type cloud service)

FIG. 26 is a diagram illustrating the overall image of services which the spoken dialogue system provides in a service type 3 (PaaS usage type cloud service). PaaS stands for "Platform as a Service", and is a cloud service providing model where a platform serving as the foundation for software architecture and operation is provided as an Internet-based service.

In this type, the data center operator 110 manages the OS 2020 and operates and manages the data center (cloud server) 2030. The service provider 120 also manages the applications 2010. The service provider 120 provides services (arrow 2040) using the OS 2020 managed by the data center operator 110 and applications 2010 managed by the service provider 120.

Service Type 4: SaaS Usage Type Cloud Service

FIG. 27 is a diagram illustrating the overall image of services which the spoken dialogue system provides in a service type 4 (SaaS usage type cloud service). SaaS stands for "Software as a Service". A SaaS usage type cloud service is a cloud service providing model having functions where corporations or individuals who do not have a data center (cloud server) can use applications provided by a platform provider having a data center (cloud server) for example, over a network such as the Internet.

In this type, the data center operator 110 manages the applications 2010, manages the OS 2020, and operates and manages the data center (cloud server) 2030. The service provider 120 provides services (arrow 2040) using the OS 2020 and applications 2010 managed by the data center operator 110.

In each of these above cloud service types, the service provider 120 provides services. The service provider or data center operator may develop the OS, applications, database for big data, and so forth, in-house, or may commission this to a third party.

The device control method, display control method, and purchase settlement method according to the present disclosure enables keeping a speaker regarding which controlling devices is undesirable from controlling the devices by voice, and is useful as a device control method of controlling multiple devices by voice, a display control method of controlling a display device which displays information relating to multiple device controlled based on voice of a speaker, and a purchase settlement method of purchasing goods by voice.

What is claimed is:

1. A device control method, comprising:
   acquiring voice information;
   obtaining a spoken command indicating a control instruction as to a device based on the acquired voice information;
   identifying speaker information relating to a speaker which has uttered the acquired voice information, based on the acquired voice information;
   identifying, of a plurality of devices, a device to be controlled, based on the spoken command and the speaker information; and
   controlling the identified device to be controlled,
   wherein, in the identifying of the device to be controlled,
   a first table and a second table are referenced,
   the first table includes a plurality of pieces of speaker information, each piece of speaker information being associated with a plurality of candidate devices, which are controlled by a speaker corresponding to the associated piece of speaker information,
   the second table includes a plurality of spoken commands, each spoken command being associated with at least one candidate device, which is controlled based on the associated spoken command,
   a candidate device is selected as the device to be controlled, when the candidate device is associated with the identified speaker information in the first table, and the same candidate device is associated with the obtained spoken command in the second table.

2. The device control method according to claim 1, wherein the speaker information includes information relating to an age of the speaker.

3. The device control method according to claim 1, wherein, in the identifying of the device to be controlled, when there is no candidate device that is associated with the identified speaker information in the first table and is also associated with the obtained spoken command in the second table, a notification is made to indicate that there is no device to be controlled.

4. The device control method according to claim 1, wherein, in the identifying of the device to be controlled, a third table is referenced, the third table including the speaker information in association with a usage history of devices by the speaker corresponding to the speaker information, and
the device to be controlled is identified based on the usage history of devices by the speaker corresponding to the speaker information, and the spoken command.

5. The device control method according to claim 4, wherein, in the identifying of the device to be controlled, a specific device is identified as the device to be controlled with priority, using history information relating to times-of-day at which the plurality of devices have been used, the specific device being a device with high frequency of usage by the speaker at a time-of-day when the voice information is acquired.

6. The device control method according to claim 1, wherein a fourth table, in which individuals of each group and voice modes are correlated, is referenced in the identifying of speaker information, and
wherein, when identification is made that speaker information is of a person not belonging to the groups, the controlling is not performed.

7. The device control method according to claim 1, further comprising:
acquiring speaker location information indicating a location of the speaker, and device location information indicating a location of each of the plurality of devices,
wherein, in the identifying of the device to be controlled, the device to be controlled is identified based on the spoken command, the speaker information, the speaker location information, and the device location information.

8. The device control method according to claim 7, wherein, the speaker location information and the device location information are acquired, based on the voice information acquired by the plurality of devices.

9. The device control method according to claim 1, wherein, content of the controlling of the identified device to be controlled changes according to the speaker information.

10. The device control method according to claim 1, further comprising:
controlling a display to display a list of first information relating to the plurality of devices which can be controlled by voice; and
controlling the display to display second information, indicating that a specific device is not controlled by voice with regard to a particular speaker, the second information being displayed at a predetermined position from the first information corresponding to the specific device.

11. The display control method according to claim 1, further comprising:
transmitting a control command to an output device that outputs sound, the control command causing the output device to perform audio output notifying that the identified device to be controlled will be controlled.

12. The display control method according to claim 1, further comprising:
controlling the identified device to be controlled, such that a light-emitter, provided in the identified device to be controlled, emits light.

* * * * *